(12) United States Patent
Komarov et al.

(10) Patent No.: US 12,476,996 B2
(45) Date of Patent: Nov. 18, 2025

(54) TECHNIQUES FOR VISUALIZING NETWORK ATTACK PATHS

(71) Applicant: Rapid7, Inc., Boston, MA (US)

(72) Inventors: Val Komarov, Fairfax, VA (US); Thomas Riley, Boston, MA (US)

(73) Assignee: Rapid7, Inc., Boston, MA (US)

( * ) Notice: Subject to any disclaimer, the term of this patent is extended or adjusted under 35 U.S.C. 154(b) by 272 days.

(21) Appl. No.: 18/478,973

(22) Filed: Sep. 29, 2023

(65) Prior Publication Data
US 2025/0112949 A1  Apr. 3, 2025

(51) Int. Cl.
*H04L 9/40* (2022.01)
*H04L 41/22* (2022.01)

(52) U.S. Cl.
CPC ......... *H04L 63/1433* (2013.01); *H04L 41/22* (2013.01); *H04L 63/1416* (2013.01)

(58) Field of Classification Search
CPC .. H04L 41/22; H04L 63/1416; H04L 63/1433
USPC ......................................................... 726/22
See application file for complete search history.

(56) References Cited

U.S. PATENT DOCUMENTS

| | | | |
|---|---|---|---|
| 11,575,696 B1 | 2/2023 | Ithal et al. | |
| 2006/0184690 A1* | 8/2006 | Milliken | H04L 63/1466 726/3 |
| 2020/0177616 A1* | 6/2020 | Hadar | H04L 63/1433 |
| 2021/0258334 A1* | 8/2021 | Sayag | H04L 63/1425 |
| 2021/0288995 A1* | 9/2021 | Attar | H04L 41/22 |
| 2022/0245260 A1* | 8/2022 | Priller | H04L 63/1433 |
| 2023/0179623 A1 | 6/2023 | Moolchandani et al. | |
| 2023/0275909 A1* | 8/2023 | Shivamoggi | H04L 63/1441 726/23 |
| 2024/0031391 A1* | 1/2024 | Baikalov | H04L 63/1425 |
| 2024/0054227 A1 | 2/2024 | Dahmen et al. | |
| 2024/0146755 A1* | 5/2024 | Ungureanu | H04L 41/12 |

(Continued)

OTHER PUBLICATIONS

[No Author Listed], Amazon S3 Access Points can now be used to securely delegate access permissions for shared datasets to other AWS accounts. Nov. 30, 2022. 3 pages. https://aws.amazon.com/about-aws/whats-new/2022/11/amazon-s3-access-points-securely-delegate-permissions-datasets-aws-accounts/ (Last accessed Sep. 29, 2023).

(Continued)

*Primary Examiner* — David P Zarka
(74) *Attorney, Agent, or Firm* — Wolf, Greenfield and Sacks P.C.

(57) ABSTRACT

An example method includes using at least one computer hardware processor to perform: identifying one or more vulnerable network resources in a plurality of network resources, each of the one or more vulnerable network resources having at least one respective security vulnerability; accessing at least one portion of a relational representation of a set of network resources in the plurality of network resources, identifying, using the at least one portion of the relational representation, one or more network attack paths between the one or more vulnerable network resources and network resources in the set, generating, using the at least one portion of the relational representation, a graph, and generating a GUI comprising a visualization of the graph and information indicating that the one or more attack paths may be used to exploit one or more security vulnerabilities of the set.

17 Claims, 16 Drawing Sheets

(56) References Cited

U.S. PATENT DOCUMENTS

2024/0265113 A1* 8/2024 Napper ................ G06F 21/552
2025/0097268 A1* 3/2025 Lahav ................... H04W 12/12
2025/0112948 A1  4/2025 Lee et al.

OTHER PUBLICATIONS

[No Author Listed], A confused deputy vulnerability in AWS AppSync. Datadog Security Labs. Nov. 21, 2022. 13 pages. https://securitylabs.datadoghq.com/articles/appsync-vulnerability-disclosure/ (Last accessed Sep. 29, 2023).

[No Author Listed], GruCloud. Publicly available at least as early as Sep. 29, 2023. 4 pages. https://www.grucloud.com/ (Last accessed Sep. 29, 2023).

[No Author Listed], Lateral Movement. Mitre ATT&CK. Oct. 17, 2018. 6 pages. https://attack.mitre.org/tactics/TA0008/ (Last accessed Sep. 29, 2023).

[No Author Listed], External memory graph traversal. Wikipedia. Jan. 30, 2023. 4 pages. https://en.wikipedia.org/wiki/External_memory_graph_traversal (Last accessed Sep. 29, 2023).

[No Author Listed], Graph traversal. Wikipedia. Jul. 23, 2023. 4 pages. https://en.wikipedia.org/wiki/Graph_traversal (Last accessed Sep. 29, 2023).

[No Author Listed], Iterative deepening depth-first search. Wikipedia. Sep. 11, 2023. 7 pages. https://en.wikipedia.org/wiki/Iterative_deepening_depth-first_search (Last accessed Sep. 29, 2023).

[No Author Listed], Intro to Content-Defined Chunking. Joshleeb Blog. Mar. 4, 2023. 7 pages. https://joshleeb.com/posts/content-defined-chunking.html (Last accessed Sep. 29, 2023).

Aksoy et al., Directional Laplacian centrality for cyber situational awareness. Digital Threats: Research and Practice (DTRAP). Oct. 15, 2021;2(4):1-28.

Chen, IAM-Deescalate: An Open Source Tool to Help Users Reduce the Risk of Privilege Escalation. Unit 42. Jul. 25, 2022. 12 pages. https://unit42.paloaltonetworks.com/iam-deescalate/ (Last accessed Sep. 29, 2023).

Costica, A new vision for cloud security unites builders and defenders. Wiz Blog. Jun. 7, 2022. 8 pages. https://www.wiz.io/blog/uniting-builders-and-defenders-a-new-vision-for-cloud-security (Last accessed Sep. 29, 2023).

Curwin et al., Identify and remediate attack paths. Microsoft Azure Defender for Cloud. Aug. 10, 2023. 9 pages. https://learn.microsoft.com/en-US/azure/defender-for-cloud/how-to-manage-attack-path (Last accessed Sep. 29, 2023).

Curwin et al., Reference list of attack paths and cloud security graph components. Microsoft Azure Defender for Cloud. Sep. 5, 2023. https://learn.microsoft.com/en-US/azure/defender-for-cloud/attack-path-reference (Last accessed Sep. 29, 2023).

Fan et al., The Case Against Specialized Graph Analytics Engines. CIDR. Jan. 4, 2015. 10 pages.

Hagberg et al., Exploring network structure, dynamics, and function using NetworkX. Proceedings of the $7^{th}$ Python in Science Conference (SciPy 2008). 5 pages.

Haque, Using GraphQL with Python—A Complete Guide. Apollo Blog. May 11, 2021. 34 pages. https://www.apollographql.com/blog/graphql/python/complete-api-guide/ (Last accessed Sep. 29, 2023).

Kedrosky, Real Life Examples of AWS and Azure Privilege Escalation. Sonrai Security. Aug. 24, 2022. 11 pages. https://sonraisecurity.com/blog/real-life-examples-of-privilege-escalation-in-aws-and-azure/ (Last accessed Sep. 29, 2023).

Maor, Understanding Attack Paths and Attack Path Analysis in a Stateful Cloud Environment Graph. Lightspin. Jun. 30, 2021. 9 pages. https://blog.lightspin.io/attack-vector-vs-attack-path-in-security-risk-analysis (Last accessed Sep. 29, 2023).

Perotti, AWS IAM Exploitation. Security Risk Advisors. Apr. 29, 2019. 26 pages. https://sra.io/blog/aws-iam-exploitation/ (Last accessed Sep. 29, 2023).

Pisha, Wiz becomes the first CNAPP to deliver integrated Data Security Posture Management. Wiz Blog. Nov. 21, 2022. 9 pages. https://www.wiz.io/blog/wiz-becomes-first-cnapp-to-deliver-integrated-data-security-posture-management (Last accessed Sep. 29, 2023).

Robbins, Managed Identity Attack Paths, Part 1: Automation Accounts. Medium. Jun. 6, 2022. 26 pages. https://posts.specterops.io/managed-identity-attack-paths-part-1-automation-accounts-82667d17187a (Last accessed Sep. 29, 2023).

Sonntag, Lateral movement risks in the cloud and how to prevent them—Part 1: the network layer (VPC). Wiz Blog. Oct. 13, 2022. 11 pages. https://www.wiz.io/blog/lateral-movement-risks-in-the-cloud-and-how-to-prevent-them-part-1-the-network-layer (Last accessed Sep. 29, 2023).

Xu, Graph Databases Burst into the Mainstream. KD Nuggets. 2018. 8 pages. https://www.kdnuggets.com/2018/02/graph-databases-burst-into-the-mainstream.html (Last accessed Sep. 29, 2023).

* cited by examiner

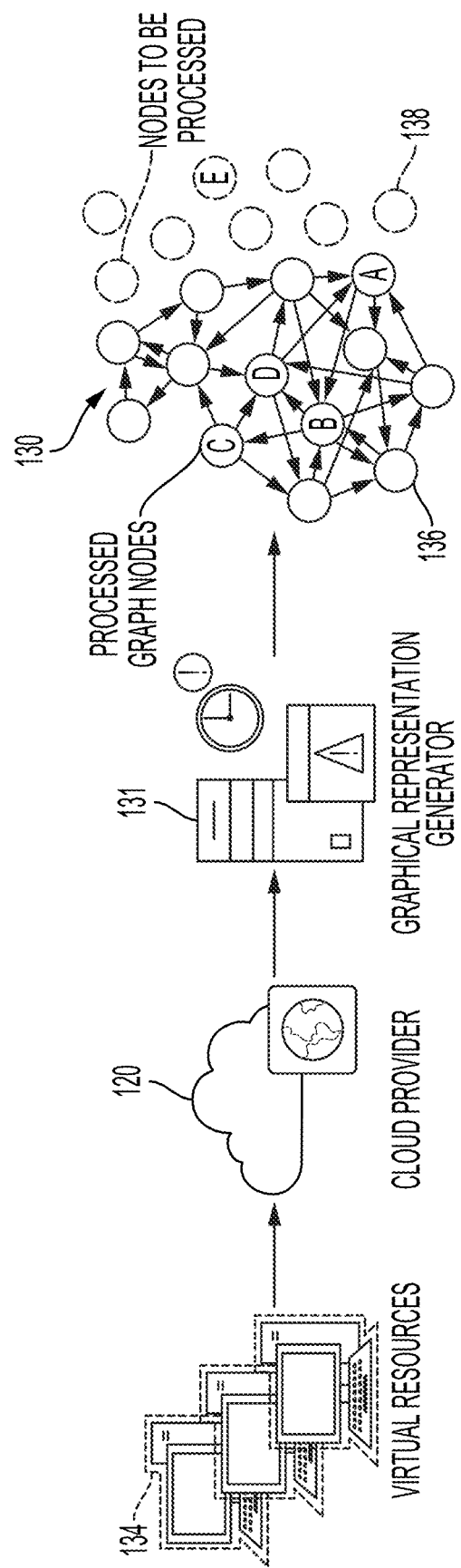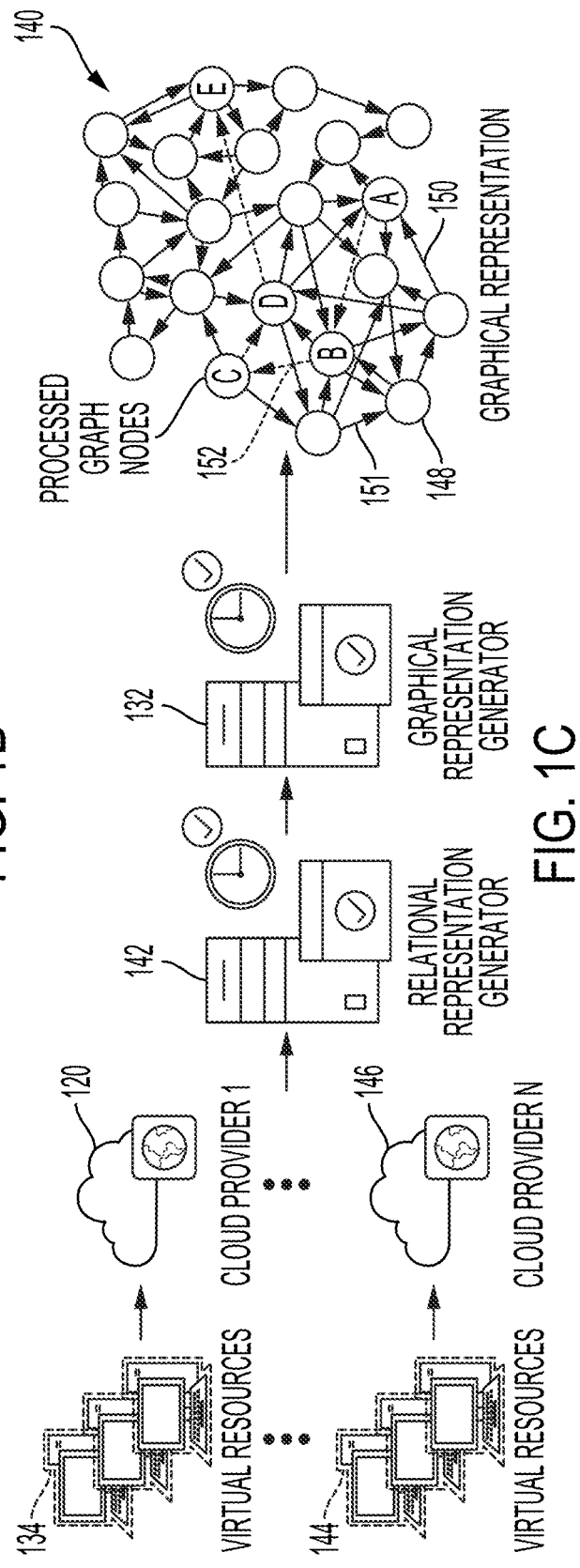
FIG. 1B
FIG. 1C

CLOUD PROVIDER TABLE — 300

| CLOUD PROVIDER TABLE ID | USER PROVIDED NAME | CLOUD PROVIDER |
|---|---|---|
| 1 | User-Dev-Account | CLOUD PROVIDER 1 |
| 5 | User-QA-Account | CLOUD PROVIDER 2 |
| 13 | Production-Account | CLOUD PROVIDER 3 |
| ... | ... | ... |

FIG. 3A

RESOURCE TABLE — 310

| RESOURCE TABLE ID | CLOUD PROVIDER | RESOURCE ID | RESOURCE TYPE |
|---|---|---|---|
| 1 | CLOUD PROVIDER 1 | 41 | INTERNET GATEWAY |
| 2 | CLOUD PROVIDER 1 | 89 | ROUTER |
| 3 | CLOUD PROVIDER 1 | 125 | LOAD BALANCER |
| ... | ... | ... | ... |

FIG. 3B

NETWORK CONNECTION (NC) TABLE

| NC TABLE ID | CLOUD PROVIDER | LABEL | STATUS | DETAILS | SOURCE RESOURCE ID | TARGET RESOURCE ID |
|---|---|---|---|---|---|---|
| 1 | CLOUD PROVIDER 1 | INTERNET GATEWAY -> ROUTER | A | The internet gateway uses a route table of the router. | 28 | 41 |
| 2 | CLOUD PROVIDER 1 | ROUTER -> LOAD BALANCER | A | The route table routes to the load balancer. | 41 | 89 |
| 3 | CLOUD PROVIDER 1 | LOAD BALANCER -> VIRTUAL MACHINE | A | The load balancer is connected to a virtual machine. | 89 | 125 |
| ... | | | | ... | | |

NETWORK PATH TABLE

| NETWORK PATH TABLE ID | CLOUD PROVIDER | NETWORK PATH TYPE | NETWORK PATH LENGTH | RESOURCE IDS OF RESOURCES IN NETWORK PATH |
|---|---|---|---|---|
| 1 | CLOUD PROVIDER 1 | INTERNETGATEWAY --> DATASTORE | 5 | 28, 41, 89, 125, 157 |
| 2 | CLOUD PROVIDER 1 | INTERNETGATEWAY --> VIRTUAL MACHINE | 6 | 20, 178, 4239, 3601, 361, 185 |
| 3 | CLOUD PROVIDER 1 | INTERNETGATEWAY --> ECS_TASK | 3 | 9, 131, 3803 |
| ... | ... | | | ... |

NETWORK PATH COMPONENT (NPC) TABLE

| NPC TABLE ID | NETWORK PATH TABLE ID | CLOUD PROVIDER | TYPE | NETWORK PATH INDEX | RESOURCE ID | NETWORK CONNECTION ID |
|---|---|---|---|---|---|---|
| 1 | 1 | CLOUD PROVIDER 1 | RESOURCE | 1 | 28 | NULL |
| 2 | 1 | CLOUD PROVIDER 1 | NETWORK CONNECTION | 2 | NULL | 1 |
| 3 | 1 | CLOUD PROVIDER 1 | RESOURCE | 3 | 41 | NULL |
| ... | ... | ... | ... | ... | ... | ... |

FIG. 3E

NETWORK ATTACK PATH TABLE

| NETWORK ATTACK PATH TABLE ID | RISK SCORE | DISCOVERED TIMESTAMP | FIRST RESOURCE ID | LAST RESOURCE ID | CLOUD PROVIDER | UNIQUE KEY | FIRST RESOURCE NAME | LAST RESOURCE NAME |
|---|---|---|---|---|---|---|---|---|
| 1 | 900 | YEAR-MM-DD HH:MM:SS | 28 | 157 | CLOUD PROVIDER 1 | OpCzba9fvAcbDfsGjlPBZg== | Internet Gateway | Datastore |
| 2 | 900 | YEAR-MM-DD HH:MM:SS | 28 | 754 | CLOUD PROVIDER 1 | 23ejyFuwwv8hwvFZzj9+A== | Internet Gateway | Virtual Machine |
| 3 | 900 | YEAR-MM-DD HH:MM:SS | 28 | 10 | CLOUD PROVIDER 1 | YWwWvIIhnqjd4jaqRoD1sFA== | Internet Gateway | ECS_TASK |
| ... | ... | ... | ... | ... | ... | ... | ... | ... |

FIG. 4A

NETWORK ATTACK PATH RESOURCE TABLE

| NETWORK ATTACK PATH RESOURCE TABLE ID | NETWORK ATTACK PATH TABLE ID | CLOUD PROVIDER | NETWORK ATTACK PATH INDEX | RESOURCE ID (RID) | RESOURCE TYPE | PROPERTIES |
|---|---|---|---|---|---|---|
| 1 | 1 | Internet | 0 | 7 | Internet | {} |
| 2 | 1 | CLOUD PROVIDER 1 | 1 | 28 | Internet Gateway | {} |
| 3 | 1 | CLOUD PROVIDER 1 | 2 | 41 | Router | {} |
| ... | ... | ... | ... | ... | ... | ... |

FIG. 4B

NETWORK ATTACK PATH NETWORK CONNECTION (NC) TABLE

| NETWORK ATTACK PATH NC TABLE ID | NETWORK ATTACK PATH TABLE ID | NETWORK PATH INDEX | LABEL | PROPERTIES | SOURCE RESOURCE ID | SOURCE CLOUD PROVIDER | TARGET RESOURCE ID | TARGET CLOUD PROVIDER |
|---|---|---|---|---|---|---|---|---|
| 1 | 1 | 0 | GOES_TO | REASONS:... | 7 | Internet | 28 | CLOUD PROVIDER 1 |
| 2 | 1 | 1 | RELATED_TO | REASONS:... | 28 | CLOUD PROVIDER 1 | 41 | CLOUD PROVIDER 1 |
| 3 | 1 | 2 | RELATED_TO | REASONS:... | 41 | CLOUD PROVIDER 1 | 89 | CLOUD PROVIDER 1 |
| ... | ... | ... | ... | ... | ... | ... | ... | ... |

FIG. 4C

TECHNIQUES FOR VISUALIZING NETWORK ATTACK PATHS

FIELD

The techniques described herein relate generally to network security and, more particularly, to techniques for visualizing network attack paths.

BACKGROUND

Computing environments may enable the delivery of software, data, and other information to remote devices and computing locations for processing. A computing environment may contain many infrastructure resources which communicate via various computer network protocols. The infrastructure resources may be physical or virtual resources that host various data and software applications. Providing computing security is important to protect the data, software applications, virtual resources, physical resources, and other infrastructure of a computing environment.

An important example of a computing environment in which it is important to provide security is a cloud computing environment. Indeed, cloud computing security is important to provide in various types of cloud computing environments including private cloud computing environments (e.g., cloud infrastructure operated for one organization), public cloud computing environments (e.g., cloud infrastructure made available for use by others, for example, over the Internet or any other network, e.g., via subscription, to multiple organizations), a hybrid cloud computing environment (a combination of publicly accessible and private infrastructure) and/or using any other type of cloud computing environment. Non-limiting examples of cloud computing environments include GOOGLE Cloud Platform (GCP), ORACLE Cloud Infrastructure (OCI), AMAZON Web Services (AWS), IBM Cloud, and MICROSOFT Azure.

SUMMARY

Some embodiments relate to a method for identifying exploitable security vulnerabilities in a computing environment, the computing environment comprising a plurality of network resources and network connections therebetween. The method comprises using at least one computer hardware processor to perform: obtaining metadata indicating a set of network resources in the plurality of network resources and network connections among network resources in the set of network resources; generating, using the metadata, a relational representation of the set of network resources, the relational representation indicating network resources in the set of network resources and network connections among the network resources in the set of network resources; generating, using the relational representation, a plurality of network paths between network resources in the set of network resources; and identifying, from among the plurality of network paths and using the relational representation and information indicating one or more of the plurality of network resources that have at least one respective security vulnerability, one or more network attack paths that may be used to exploit one or more security vulnerabilities of network resources in the set of network resources.

Some embodiments relate to a network attack path identification system comprising at least one non-transitory computer readable storage medium storing instructions; and at least one computer hardware processor to execute the instructions to perform a method for identifying exploitable security vulnerabilities in a computing environment, the computing environment comprising a plurality of network resources and network connections therebetween. The method comprising: obtaining metadata indicating a set of network resources in the plurality of network resources and network connections among network resources in the set of network resources; generating, using the metadata, a relational representation of the set of network resources, the relational representation indicating network resources in the set of network resources and network connections among the network resources in the set of network resources; generating, using the relational representation, a plurality of network paths between network resources in the set of network resources; and identifying, from among the plurality of network paths and using the relational representation and information indicating one or more of the plurality of network resources that have at least one respective security vulnerability, one or more network attack paths that may be used to exploit one or more security vulnerabilities of network resources in the set of network resources.

Some embodiments relate to at least one non-transitory computer readable storage medium comprising instructions that, when executed by at least one computer hardware processor, causes the at least one computer hardware processor to perform a method for identifying exploitable security vulnerabilities in a computing environment, the computing environment comprising a plurality of network resources and network connections therebetween. The method comprising: obtaining metadata indicating a set of network resources in the plurality of network resources and network connections among network resources in the set of network resources; generating, using the metadata, a relational representation of the set of network resources, the relational representation indicating network resources in the set of network resources and network connections among the network resources in the set of network resources; generating, using the relational representation, a plurality of network paths between network resources in the set of network resources; and identifying, from among the plurality of network paths and using the relational representation and information indicating one or more of the plurality of network resources that have at least one respective security vulnerability, one or more network attack paths that may be used to exploit one or more security vulnerabilities of network resources in the set of network resources.

Some embodiments relate to a method for visualizing exploitable security vulnerabilities in a computing environment, the computing environment comprising a plurality of network resources and network connections therebetween. The method comprising: using at least one computer hardware processor to perform: identifying one or more vulnerable network resources in the plurality of network resources, each of the one or more vulnerable network resources having at least one respective security vulnerability; accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources; identifying, using the at least one portion of the relational representation, one or more network attack paths between the one or more vulnerable network resources and network resources in the set of network resources; generating, using the at least one portion of the relational representation, a graph comprising nodes and edges, the nodes representing the one or more vulnerable network resources and network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources.

Some embodiments relate to a network attack path visualization system comprising at least one non-transitory computer readable storage medium storing instructions; and at least one computer hardware processor to execute the instructions to perform a method for visualizing exploitable security vulnerabilities in a computing environment, the computing environment comprising a plurality of network resources and network connections therebetween. The method comprising: identifying one or more vulnerable network resources in the plurality of network resources, each of the one or more vulnerable network resources having at least one respective security vulnerability; accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources; identifying, using the at least one portion of the relational representation, one or more network attack paths between the one or more vulnerable network resources and network resources in the set of network resources; generating, using the at least one portion of the relational representation, a graph comprising nodes and edges, the nodes representing the one or more vulnerable network resources and network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources.

Some embodiments relate to at least one non-transitory computer readable storage medium comprising instructions that, when executed by at least one computer hardware processor, causes the at least one computer hardware processor to perform a method for visualizing exploitable security vulnerabilities in a computing environment, the computing environment comprising a plurality of network resources and network connections therebetween. The method comprising: identifying one or more vulnerable network resources in the plurality of network resources, each of the one or more vulnerable network resources having at least one respective security vulnerability; accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources; identifying, using the at least one portion of the relational representation, one or more network attack paths between the one or more vulnerable network resources and network resources in the set of network resources; generating, using the at least one portion of the relational representation, a graph comprising nodes and edges, the nodes representing the one or more vulnerable network resources and network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources.

The foregoing summary is not intended to be limiting. Moreover, various aspects of the present disclosure may be implemented alone or in combination with other aspects.

BRIEF DESCRIPTION OF FIGURES

Various aspects and embodiments will be described with reference to the following figures. It should be appreciated that the figures are not necessarily drawn to scale. Items appearing in multiple figures are indicated by the same or a similar reference number in all the figures in which they appear.

FIG. 1B shows generating an example graphical representation of the computing environment of FIG. 1A using a graphical representation generator, in accordance with some embodiments of the technology described herein.

FIG. 1C shows generating another example graphical representation of the computing environment of FIG. 1A using a relational representation generator and a graphical representation generator, in accordance with some embodiments of the technology described herein.

FIG. 3A shows an example implementation of a cloud table containing information indicating values of attributes of cloud provider(s) associated with the computing environment of FIG. 1A, in accordance with some embodiments of the technology described herein.

FIG. 3B shows an example implementation of a resource table containing information indicating values of attributes of resources of the computing environment of FIG. 1A, in accordance with some embodiments of the technology described herein.

FIG. 3C shows an example implementation of a network connection table containing information indicating values of attributes of network connections of the computing environment of FIG. 1A, in accordance with some embodiments of the technology described herein.

FIG. 3D shows an example implementation of a network path table containing information indicating values of attributes of network paths of the computing environment of FIG. 1A, in accordance with some embodiments of the technology described herein.

FIG. 3E shows an example implementation of a network path components table containing information indicating values of attributes of the computing environment, the resources, the network connections, and the network paths of FIG. 1A, in accordance with some embodiments of the technology described herein.

FIG. 4A shows an example implementation of a network attack path table containing information indicating values of attributes of network attack paths of the computing environment of FIG. 1A, in accordance with some embodiments of the technology described herein.

FIG. 4B shows an example implementation of a network attack path resource table containing information indicating values of attributes of resources in network attack paths of the computing environment of FIG. 1A, in accordance with some embodiments of the technology described herein.

FIG. 4C shows an example implementation of a network attack path network connection table containing information indicating values of attributes of network connections in network attack paths of the computing environment of FIG. 1A, in accordance with some embodiments of the technology described herein.

DETAILED DESCRIPTION

Figure 1A:
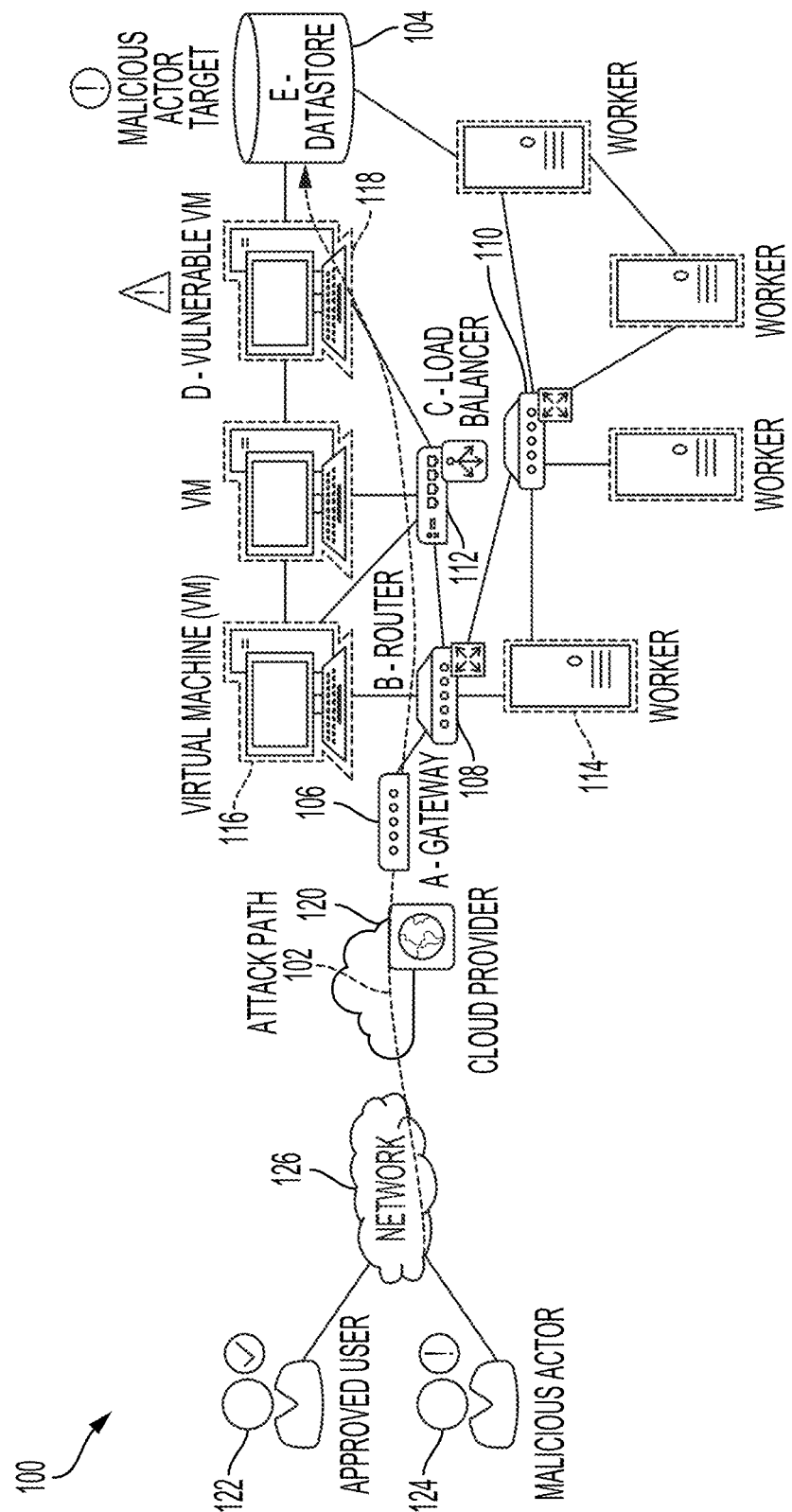
FIG. 1A shows an example computing environment in which a network attack path may be used to exploit a resource of the computing environment, in accordance with some embodiments of the technology described herein.

As discussed above, it is important to provide security in the context of computing environments (e.g., cloud computing environments) to protect the data, software, and infrastructure of such environments. One aspect of providing cloud computing environment security is monitoring the physical and/or virtual resources within the cloud computing environment to detect security vulnerabilities (e.g., malware, viruses, outdated or not-up-to-date software, misconfigurations, suboptimal encryption, weak or easily discernable security credentials, etc.). Detecting security vulnerabilities within a cloud computing environment may involve identifying attack paths, such as network attack paths, that may be used to exploit such security risks.

Computing environments, such as cloud computing environments, are targets for non-authorized users. Non-authorized users of a computing environment (e.g., a cloud computing environment) may be entities and/or users motivated to interrupt operation of software hosted by the computing infrastructure (e.g., the cloud computing infrastructure) and/or access highly sensitive data such as financial information and/or personal identifiable information (PII). Non-authorized users may access and/or gain entry to the computing environment (e.g., the cloud computing environment) via an attack vector. An attack vector (also referred to as a threat vector) is a method, pathway, or set of circumstances that can be exploited to break into a computing environment and, thus, compromise its security. Non-limiting examples of attack vectors include determining easily discernible access and/or security credentials to a resource (e.g., a cloud resource), decrypting suboptimal encryption of server-hosted data, exploiting misconfigurations of a resource (e.g., a cloud resource), and taking advantage of a resource (e.g., a cloud resource) allowing access to sensitive data via privilege escalation. For example, an attack vector may be a path that a computer hacker or other malicious actor takes, such as sequentially accessing one or more resources (e.g., cloud resources), to exploit cybersecurity vulnerabilities associated with the one or more resources (e.g., cloud resources) and/or, more generally, a computing environment (e.g., a cloud computing environment).

An example of an attack vector is an attack path (also referred to as a network attack path), which is a pathway between resources (e.g., cloud resources) through which a malicious actor may use to exploit one or more security vulnerabilities of one or more of the resources. For example, an attack path may be a network path in a computing environment (e.g., a cloud computing environment) along which a plurality of resources (e.g., cloud resources) is connected to each other via network connections. In some embodiments, a resource of the plurality of resources may have a security vulnerability that may be exploited by a malicious actor to compromise the resource and/or other resources in the attack path. Visualizing an attack path may enable a user to detect security vulnerabilities and the specific steps a malicious actor may take to exploit the security vulnerabilities, traverse through a computing environment (e.g., a cloud computing environment), and ultimately compromise critical resources.

The inventors have recognized that conventional data structures used to generate a graphical representation (e.g., a graph) of a computing environment may be improved upon. For example, conventional data structures used to generate a graph may be graph data structures stored in a graph database. A graph data structure may consist of nodes (e.g., discrete objects) that can be connected by relationships (e.g., edges). A graph database may use the nodes to store data entities, and edges to store relationships between entities. In some instances, a graph database representing a computing environment for a relatively large and/or complex computing environment may include hundreds or thousands of nodes and/or thousands (e.g., tens of thousands, hundreds of thousands) of edges.

The inventors have recognized that identifying network attack paths in a network graph using conventional data structures is computationally intensive. For example, conventional techniques require loading the entire network graph into memory in order to analyze the network graph to identify network attack paths and/or obtain information about one or more network attack paths of interest. In some instances, conventional techniques may load thousands (e.g., tens of thousands, hundreds of thousands) of graph data structures into memory of a computing system to generate a network graph, and the loading of such a large number of graph data structures may consume a substantial portion and/or an entirety of the memory. In some such examples, the graph data structures may be loaded into memory to enable a graph library to generate a graph that represents every network path of a computing environment. Non-limiting examples of graph libraries include graph-tool, igraph, NetworkX, and SNAP.

The inventors have also recognized that conventional data structures for identifying network attack paths in a network graph are not scalable. For example, conventional graph data structures do not scale with the size and complexity of typical computing environments (e.g., cloud computing environments) because graph data structures are non-linear data structures. For instance, as the number of nodes increase in a growing computing environment, the number of vertices and/or edges associated with the number of nodes increases at a non-linear rate. Accordingly, as the size and/or complexity of a computing environment increases, a number of graph data structures to represent such a growing computing environment may increase at a scale beyond that which physical hardware resources of a computing system is capable of processing.

In addition, the inventors have recognized that conventional data structures for visualizing network attack paths may reduce the efficiency of evaluating a network graph for network attack paths. For example, conventional techniques for visualizing a network graph may involve generating a graphical user interface (GUI) including a visualization of the network graph that represents every network path of an entire computing environment. However, as discussed above, typical computing environments may be substantially large and complex such that there may be hundreds or thousands of potential network paths to be visualized and analyzed for network attack path classification. Such a significant number of potential network attack paths to analyze, each of which may include a plurality of nodes (e.g., 5 nodes, 10 nodes, 25 nodes, etc.), may overwhelm the user(s) responsible for securing the computing environments. Accordingly, a user may have a burdensome and/or cumbersome experience attempting to visualize and subsequently analyze hundreds or thousands of potential network attack paths.

The inventors have also recognized that processing data transactions using a graph may be improved upon. Some conventional techniques for extracting data of interest from a network graph involve loading the entire network graph representing a computing environment into memory of a computing system and querying the underlying graph database for the data of interest. However, loading the entire network graph into memory is exceptionally inefficient for a computing system. For example, a user may seek information about a specific node in the network graph. In such an example, conventional techniques may load the entire network graph into memory, identify the specific node in the network graph, and return information about the specific node to the user.

Accordingly, the inventors have developed new techniques for identifying and/or visualizing attack paths in the computing environment. Instead of relying on a graph-based network representation to identify network attack paths, the inventors have developed a new representation (using different data structure(s)) for representing computing environment information. This new representation is a relational representation and represents computing environment information using one or more relations (e.g., tables), which unlike graphical representations, may be more easily manipulatable and able to be more independently analyzed. For example, it is easier and more efficient to access individual rows of a relational representation such as a table rather than processing an entire network graph to access individual node and/or edge information. In another example, a relational representation may be used to identify network attack paths with improved speed because less information may need to be loaded into memory, such as one or more rows of a table corresponding to a node, instead of loading an entire network graph into memory for identification of network attack paths in the network graph.

Accordingly, some embodiments, provide a method for identifying exploitable security vulnerabilities in a computing environment (e.g., the computing environment shown in FIG. 1A), the computing environment comprising a plurality of network resources (e.g., the resources shown in FIG. 1A, the virtual resources shown in FIGS. 1B and/or 1C) and network connections therebetween. The method includes, using at least one computer hardware processor (e.g., the processor circuitry shown in FIG. 13) to perform: obtaining metadata (e.g., the computing environment metadata shown in FIG. 2) indicating a set of network resources (e.g., a set of resources shown in FIG. 1A) in the plurality of network resources and network connections among network resources in the set of network resources; generating, using the metadata, a relational representation (e.g., the cloud table shown in FIG. 3A, the resource table shown in FIG. 3B, the network connection table shown in FIG. 3C, the network path table shown in FIG. 3D, the network path component table shown in FIG. 3E) of the set of network resources, the relational representation indicating network resources in the set of network resources and network connections among the network resources in the set of network resources; generating, using the relational representation, a plurality of network paths (e.g., the paths shown in FIG. 1C) between network resources (e.g., nodes "A", "B", "C", "D", and "E" shown in FIG. 1C) in the set of network resources; and identifying, from among the plurality of network paths and using the relational representation and information indicating one or more of the plurality of network resources that have at least one respective security vulnerability, one or more network attack paths (e.g., the network attack path shown in FIG. 1A, the network attack path shown in FIG. 1C) that may be used to exploit one or more security vulnerabilities of network resources in the set of network resources.

In some embodiments, generating the relational representation of the set of network resources using the metadata comprises generating at least one table (e.g., the cloud table shown in FIG. 3A, the resource table shown in FIG. 3B, the network connection table shown in FIG. 3C, the network path table shown in FIG. 3D, the network path component table shown in FIG. 3E) using the metadata.

Figure 2:
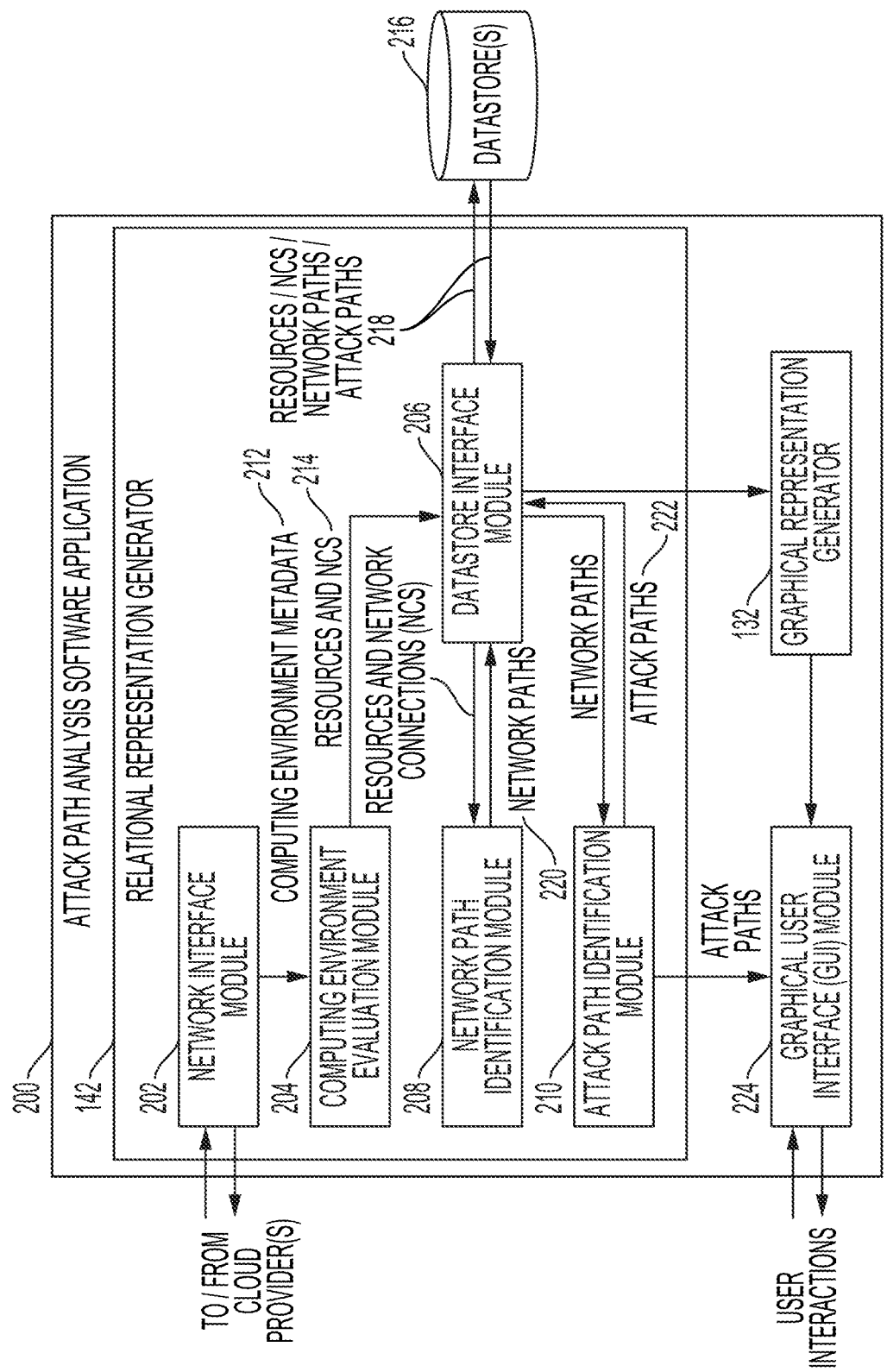
FIG. 2 shows an example implementation of an attack path analysis software application including the relational representation generator and the graphical representation generator of FIG. 1C, in accordance with some embodiments of the technology described herein.

In some embodiments, the metadata contains information indicating values of attributes of individual network resources (e.g., the values of attributes in the network resource table shown in FIG. 3B) in the set of network resources, information indicating values of attributes of the network connections (e.g., the values of attributes in the network connection table shown in FIG. 3C) among the network resources in the set of network resources, and information indicating values of attributes of the plurality of network paths (e.g., the values of attributes in the network path table shown in FIG. 3D), and wherein generating the at least one table using the metadata comprises: generating a first table (e.g., the resource table shown in FIG. 3B) using the information indicating the values of attributes of the individual network resources in the set of network resources; generating a second table (e.g., the network connection table shown in FIG. 3C) using the information indicating the values of attributes of the network connections among the network resources in the set of network resources; generating a third table (e.g., the network path table shown in FIG. 3D) using the information indicating the values of attributes of the plurality of network paths; and storing the first, second, and third table in at least one datastore (e.g., the at least one datastore shown in FIG. 2). In some embodiments, the method further comprises storing the relational representation in at least one datastore (e.g., the at least one datastore shown in FIG. 2).

In some embodiments, the method further comprises after identifying the one or more network attack paths, generating a table (e.g., the network attack path table shown in FIG. 4A) storing information specifying the one or more network attack paths; and storing the table in at least one datastore (e.g., the at least one datastore shown in FIG. 2).

In some embodiments, the method further comprises: generating a risk score (e.g., the risk score in the network attack path table shown in FIG. 4A) for each of the one or more network attack paths, the risk score representing a degree to which a network attack path (e.g., the network attack path shown in FIG. 1A, the network attack path shown in FIG. 1C) may be used to exploit the one or more security vulnerabilities of the network resources in the set of network resources; storing the risk score for each of the one or more network attack paths in at least one table (e.g., the network attack path table shown in FIG. 4A); and outputting a ranking of the one or more network attack paths based on their respective risk scores.

In some embodiments, generating the plurality of network paths comprises applying a graph traversal technique to data stored in the relational representation. In some embodiments, applying the graph traversal technique comprises performing a breadth first search, a depth first search, or a combination of breadth first search and depth first search.

In some embodiments, a first network path of the plurality of network paths comprises a first network resource (e.g., the vulnerable and exploitable resource shown in FIG. 5) in the set of network resources, the one or more security vulnerabilities comprise a first security vulnerability, the method further comprises: determining that at least one portion of the relational representation corresponding to the first network resource conforms to a network attack path definition defining the first security vulnerability; and identifying the first network resource to have the first security vulnerability based on the at least one portion of the relational representation conforming to the network attack path definition.

In some embodiments, the method further comprises: determining that a network resource (e.g., the vulnerable and exploitable resource shown in FIG. 5) in the plurality of network resources is a vulnerable network resource based on the network resource having at least one security vulnerability; determining that one or more network resources (e.g., the other resources shown in FIG. 5) in the set of network resources have a respective network connection to the vulnerable network resource; and identifying the one or more network resources as exploitable network resources based on the one or more network resources having the respective network connection to the vulnerable network resource.

Figure 13:
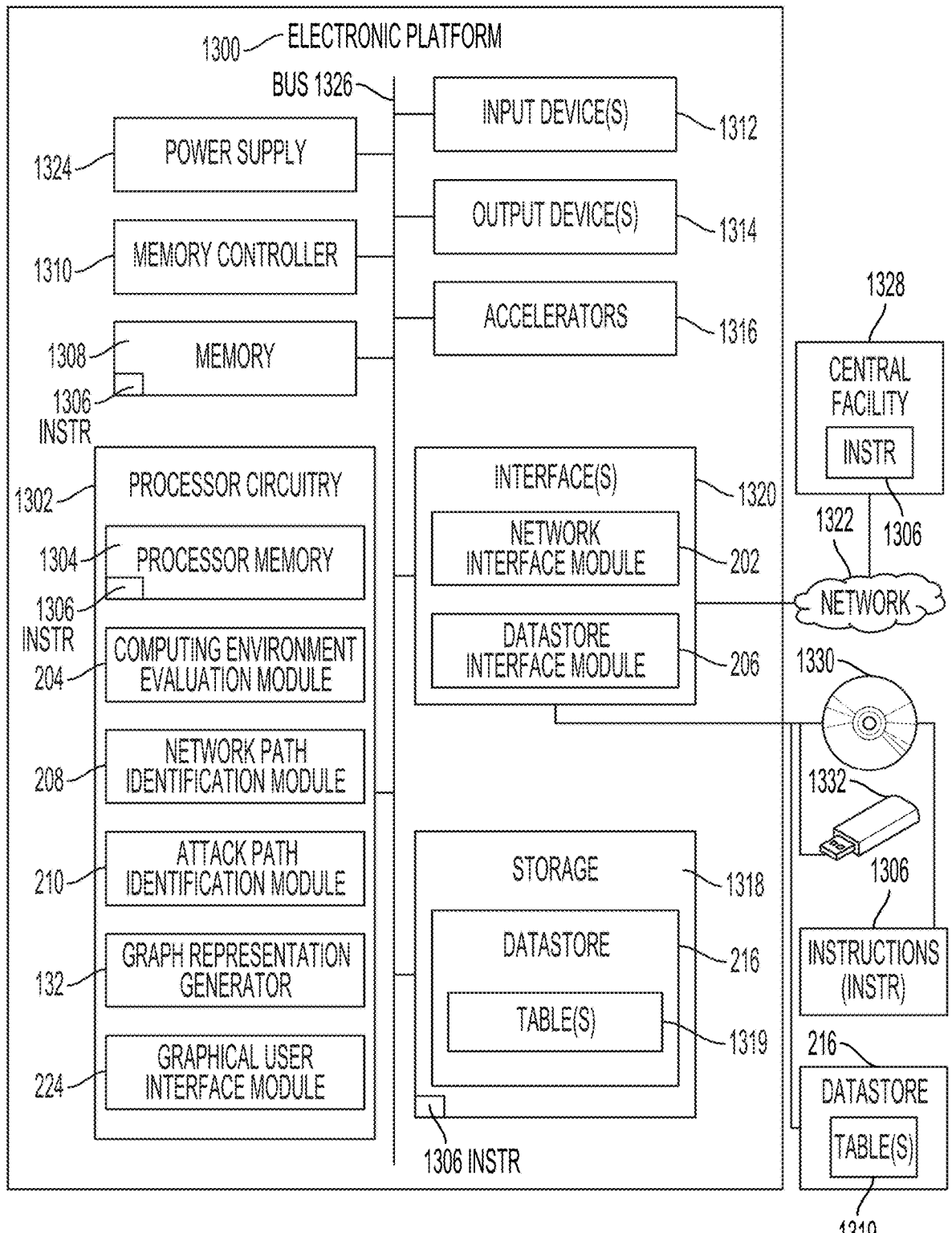
FIG. 13 is an example electronic platform structured to execute the machine-readable instructions of FIGS. 8, 9, 10, 11, and/or 12 to implement the attack path analysis software application of FIG. 2, according to some embodiments of the technology described herein.

Some embodiments provide a network attack path identification system (e.g., the electronic platform shown in FIG. 13) comprising: at least one non-transitory computer readable storage medium (e.g., the memory, the processor memory, and/or the storage shown in FIG. 13) storing instructions (e.g., the instructions shown in FIG. 13); and at least one computer hardware processor (e.g., the processor circuitry shown in FIG. 13) to execute the instructions to perform a method for identifying exploitable security vulnerabilities in a computing environment (e.g., the computing environment shown in FIG. 1A), the computing environment comprising a plurality of network resources (e.g., the resources shown in FIG. 1A, the virtual resources shown in FIGS. 1B and/or 1C) and network connections therebetween. The method includes obtaining metadata (e.g., the computing environment metadata shown in FIG. 2) indicating a set of network resources (e.g., a set of resources shown in FIG. 1A) in the plurality of network resources and network connections among network resources in the set of network resources; generating, using the metadata, a relational representation (e.g., the cloud table shown in FIG. 3A, the resource table shown in FIG. 3B, the network connection table shown in FIG. 3C, the network path table shown in FIG. 3D, the network path component table shown in FIG. 3E) of the set of network resources, the relational representation indicating network resources in the set of network resources and network connections among the network resources in the set of network resources; generating, using the relational representation, a plurality of network paths (e.g., the paths shown in FIG. 1C) between network resources (e.g., nodes "A", "B", "C", "D", and "E" shown in FIG. 1C) in the set of network resources; and identifying, from among the plurality of network paths and using the relational representation and information indicating one or more of the plurality of network resources that have at least one respective security vulnerability, one or more network attack paths (e.g., the network attack path shown in FIG. 1A, the network attack path shown in FIG. 1C) that may be used to exploit one or more security vulnerabilities of network resources in the set of network resources.

In some embodiments, the metadata contains information indicating values of attributes of individual network resources (e.g., the values of attributes in the network resource table shown in FIG. 3B) in the set of network resources, information indicating values of attributes of the network connections (e.g., the values of attributes in the network connection table shown in FIG. 3C) among the network resources in the set of network resources, and information indicating values of attributes of the plurality of network paths (e.g., the values of attributes in the network path table shown in FIG. 3D), the at least one computer hardware processor is to: generate a first table (e.g., the resource table shown in FIG. 3B) using the information indicating the values of attributes of the individual network resources in the set of network resources; generate a second table (e.g., the network connection table shown in FIG. 3C) using the information indicating the values of attributes of the network connections among the network resources in the set of network resources; generate a third table (e.g., the network path table shown in FIG. 3D) using the information indicating the values of attributes of the plurality of network paths; and store the first, second, and third table in at least one datastore (e.g., the at least one datastore shown in FIG. 2).

In some embodiments, the at least one computer hardware processor is to: after identifying the one or more network attack paths, generate a table (e.g., the network attack path table shown in FIG. 4A) storing information specifying the one or more network attack paths; and cause storage of the table in at least one datastore (e.g., the at least one datastore shown in FIG. 2).

In some embodiments, the at least one computer hardware processor is to: generate a risk score (e.g., the risk score in the network attack path table shown in FIG. 4A) for each of the one or more network attack paths, the risk score representing a degree to which a network attack path (e.g., the network attack path shown in FIG. 1A, the network attack path shown in FIG. 1C) may be used to exploit the one or more security vulnerabilities of the network resources in the set of network resources; cause storage of the risk score for each of the one or more network attack paths in at least one table (e.g., the network attack path table shown in FIG. 4A); and output a ranking of the one or more network attack paths based on their respective risk scores.

In some embodiments, a first network path of the plurality of network paths comprises a first network resource (e.g., the vulnerable and exploitable resource shown in FIG. 5) in the set of network resources, the one or more security vulnerabilities comprise a first security vulnerability, the at least one computer hardware processor is to: determine that at least one portion of the relational representation corresponding to the first network resource conforms to a network attack path definition defining the first security vulnerability; and identify the first network resource to have the first security vulnerability based on the at least one portion of the relational representation conforming to the network attack path definition.

Some embodiments provide for at least one non-transitory computer readable storage medium (e.g., the memory, the processor memory, and/or the storage shown in FIG. 13) comprising instructions (e.g., the instructions shown in FIG. 13) that, when executed by at least one computer hardware processor (e.g., the processor circuitry shown in FIG. 13), causes the at least one computer hardware processor to perform a method for identifying exploitable security vulnerabilities in a computing environment (e.g., the computing environment shown in FIG. 1A), the computing environment comprising a plurality of network resources (e.g., the resources shown in FIG. 1A, the virtual resources shown in FIG. 1B and/or 1C) and network connections therebetween. The method includes: obtaining metadata (e.g., the computing environment metadata shown in FIG. 2) indicating a set of network resources (e.g., a set of the resources shown in FIG. 1A) in the plurality of network resources and network connections among network resources in the set of network resources; generating, using the metadata, a relational representation (e.g., the resource table shown in FIG. 3B) of the set of network resources, the relational representation indicating network resources in the set of network resources and network connections among the network resources in the set of network resources; generating, using the relational representation, a plurality of network paths (e.g., the network paths shown in FIG. 1C) between network resources in the set of network resources; and identifying, from among the plurality of network paths and using the relational representation and information indicating one or more of the plurality of network resources that have at least one respective security vulnerability, one or more network attack paths (e.g., the network attack path shown in FIG. 1A, the network attack path shown in FIG. 1C) that may be used to exploit one or more security vulnerabilities of network resources in the set of network resources.

In some embodiments, the metadata contains information indicating values of attributes of individual network resources in the set of network resources, information indicating values of attributes of the network connections among the network resources in the set of network resources, and information indicating values of attributes of the plurality of network paths, the instructions to cause the at least one computer hardware processor to: generate a first table (e.g., the resource table shown in FIG. 3B) using the information indicating the values of attributes of the individual network resources in the set of network resources; generate a second table (e.g., the network connection table shown in FIG. 3C) using the information indicating the values of attributes of the network connections among the network resources in the set of network resources; generate a third table (e.g., the network path table shown in FIG. 3D) using the information indicating the values of attributes of the plurality of network paths; and store the first, second, and third table in at least one datastore (e.g., the at least one datastore shown in FIG. 2).

In some embodiments, the instructions cause the at least one computer hardware processor to: after identifying the one or more network attack paths, generate a table (e.g., the network attack path table shown in FIG. 4A) storing information specifying the one or more network attack paths; and cause storage of the table in at least one datastore (e.g., the at least one datastore shown in FIG. 2).

In some embodiments, the instructions cause the at least one computer hardware processor to: generate a risk score (e.g., the risk score in the network attack path table shown in FIG. 4A) for each of the one or more network attack paths, the risk score representing a degree to which a network attack path may be used to exploit the one or more security vulnerabilities of the network resources in the set of network resources; cause storage of the risk score for each of the one or more network attack paths in at least one table (e.g., the network attack path table shown in FIG. 4A); and output a ranking of the one or more network attack paths based on their respective risk scores.

In some embodiments, a first network path of the plurality of network paths comprises a first network resource (e.g., the vulnerable and exploitable resource shown in FIG. 5) in the set of network resources, the one or more security vulnerabilities comprise a first security vulnerability, the instructions to cause the at least one computer hardware processor to: determine that at least one portion of the relational representation corresponding to the first network resource conforms to a network attack path definition defining the first security vulnerability; and identify the first network resource to have the first security vulnerability based on the at least one portion of the relational representation conforming to the network attack path definition.

Some embodiments provide for a method for visualizing exploitable security vulnerabilities in a computing environment (e.g., the computing environment shown in FIG. 1A), the computing environment comprising a plurality of network resources (e.g., the resources shown in FIG. 1A, the virtual resources shown in FIGS. 1B and/or 1C) and network connections therebetween, the method includes: using at least one computer hardware processor (e.g., the processor circuitry shown in FIG. 13) to perform: identifying one or more vulnerable network resources (e.g., the vulnerable VM shown in FIG. 1A, the vulnerable and exploitable network resource shown in FIG. 5) in the plurality of network resources, each of the one or more vulnerable network resources having at least one respective security vulnerability; accessing at least one portion of a relational representation (e.g., the cloud table shown in FIG. 3A, the resource table shown in FIG. 3B, the network connection table shown in FIG. 3C, the network path table shown in FIG. 3D, the network path component table shown in FIG. 3E) of a set of network resources (a set of resources shown in FIG. 1A) in the plurality of network resources, the relational representation indicating network resources in the set of network resources and network connections among the network resources in the set of network resources, the at least one portion of the relational representation corresponding to the one or more vulnerable network resources; identifying, using the at least one portion of the relational representation, one or more network attack paths (e.g., the network attack path shown in FIG. 1A, the network attack path shown in FIG. 1C) between the one or more vulnerable network resources and network resources in the set of network resources; generating, using the at least one portion of the relational representation, a graph (e.g., the graphical representation shown in FIG. 1C) comprising nodes (e.g., the nodes shown in FIG. 1C) and edges (e.g., the edges shown in FIG. 1C), the nodes representing the one or more vulnerable network resources and network resources in the set of network resources along the one or more network attack paths, the edges representing the one or more network attack paths; and generating a graphical user interface (GUI) (e.g., the GUI shown in FIG. 6, the GUI shown in FIG. 7) comprising a visualization (e.g., the visualization shown in FIG. 5, the visualization shown in FIG. 6, the visualization shown in FIG. 7) of the graph and information indicating that the one or more attack paths may be used to exploit one or more security vulnerabilities of network resources in the set of network resources.

In some embodiments, the method further comprises: obtaining metadata (e.g., the computing environment metadata shown in FIG. 2) indicating the set of network resources in the plurality of network resources and the network connections among the network resources in the set of network resources; and generating, using the metadata, the relational representation of the set of network resources.

In some embodiments, the method further comprises: generating, using the relational representation, a plurality of network paths (e.g., the network paths shown in FIG. 1C) between network resources in the set of network resources; and identifying, from among the plurality of network paths and using the relational representation and information indicating one or more of the plurality of network resources that have the at least one respective security vulnerability, at least the one or more network attack paths.

In some embodiments, generating the GUI comprising the visualization comprises generating at least one GUI element (e.g., the at least one GUI element shown in FIG. 6, the at least one GUI element shown in FIG. 7) containing content indicating an explanation for why the one or more network attack paths are identified as attack paths.

In some embodiments, generating the GUI comprising the visualization comprises generating at least one GUI element (e.g., the at least one GUI element shown in FIG. 6, the at least one GUI element shown in FIG. 7) containing content indicating one or more operations actionable by a user to at least one of mitigate or resolve the at least one respective security vulnerability of the one or more vulnerable network resources.

In some embodiments, generating the at least one GUI element comprises identifying at least one of (i) an update to firmware or software of the one or more vulnerable network resources, (ii) one or more changes to security settings of the one or more vulnerable network resources, or (iii) a reconfiguration of at least one portion of the computing environment as the one or more operations.

In some embodiments, the method further comprises: receiving user input indicating a selection of a node (e.g., the vulnerable and exploitable resource shown in FIG. 5, a node in the attack path shown in FIG. 6, a node in the attack path shown in FIG. 7) in the plurality of nodes, the node displayed in the visualization, the selected node representing one of the one or more vulnerable network resources; and identifying one or more nodes in the plurality of nodes that have a respective network connection to the selected node, and wherein generating the GUI comprising the visualization comprises: displaying at least one GUI element containing content that indicates that the one or more nodes in the plurality of nodes are exploitable based on the one or more nodes having a respective network connection to a node representing a vulnerable network resource.

Beneficially, the techniques developed by the inventors include using a relational representation to identify attack paths in a computing environment with increased computational efficiency and a reduced requirement of physical hardware resources. For example, instead of loading an entire network graph of an entire computing environment into memory, the techniques developed by the inventors identify a portion of the relational representation (with different data structures that conventional graph data structures) that corresponds to a resource of interest, such as a resource having a security vulnerability, and identifies (e.g., automatically identifies) attack paths. The techniques developed by the inventors may load the portion of the relational representation into memory to identify security vulnerabilities associated with the portion. By analyzing/evaluating the portion of the relational representation instead of analyzing/evaluating the entire network graph, computational efficiencies and a reduction in physical hardware resources to perform the analyzing/evaluating may be achieved because loading one or more rows of a relational representation, such as a table, requires less time and/or resources to perform than loading an entire network graph into memory. In addition, processing the relational representation may consume less physical hardware resources because, in some embodiments, loading and/or processing data values stored in a relational representation (e.g., one or more tables) consumes less physical hardware resources than loading and/or processing substantially large, complex, and/or sprawling network graphs of a computing environment. Further, in some such embodiments, processing data transactions using the relational representation is computationally more efficient by using less physical hardware resources and taking less time to complete the data transactions than processing data transactions using an entire network graph of a computational environment.

The techniques developed by the inventors also provide an improvement over conventional techniques of visualizing network attack paths by using a relational representation (with different data structures than conventional graph data structures). For example, the techniques developed by the inventors may include generating and/or presenting visualization(s) representing a portion of a computing environment that is of heightened interest to a user by using portion(s) of a relational representation of the computing environment. In such an example, a user may be concerned with the identified network attack paths containing vulnerable and/or exploitable resources instead of other portions of a computing environment that do not have such security risks. By outputting and/or presenting visualization(s) to a user representing a curated portion of the computing environment, instead of presenting a visualization of the entire computing environment as in conventional techniques, a user may quickly and readily discern security risks and take the appropriate actions to mitigate (e.g., reduce or eliminate) them.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Turning to the figures, the illustrated example of FIG. 1A shows an example computing environment 100 in which an attack path 102 may be used to exploit a resource 104 of the computing environment 100. The computing environment 100 of this example is a cloud computing environment. Non-limiting examples of cloud computing environments include private cloud computing environments (e.g., cloud infrastructure operated for one organization), public cloud computing environments (e.g., cloud infrastructure made available for use by others, for example, over the Internet or any other network, e.g., via subscription, to multiple organizations), and a hybrid cloud computing environment (a combination of publicly accessible and private infrastructure). However, the techniques described herein are applicable to any type of public and/or private computing environment. Non-limiting examples of public computing environments include wired and/or wireless network connections with either no access credentials or access credentials made readily available to the public. For example, a public computing environment may be a Wireless Fidelity (Wi-Fi) network (or any other network such as a cellular network) configured for public access such as a network associated with an airport, a café (e.g., a bakery, a coffee shop), a library, a restaurant, a retail store, or any other public setting. Any other type of public computing environment is contemplated. Non-limiting examples of private computing environments include enterprise and government managed networks. For example, a private computing environment may be a wired and/or wireless network managed by a private enterprise (e.g., a private company) for exclusive use by users of the private enterprise. Any other type of private computing environment is contemplated.

The computing environment 100 of the illustrated example includes a plurality of resources 104, 106, 108, 110, 112, 114, 116, 118 hosted and/or managed by a cloud provider 120. The cloud provider 120 of this example is a public cloud provider. Non-limiting examples of public cloud providers include GOOGLE Cloud Platform (GCP), ORACLE Cloud Infrastructure (OCI), AMAZON Web Services (AWS), IBM Cloud, and MICROSOFT Azure. Alternatively, the cloud provider 120 may be a private cloud provider such as a private and/or otherwise non-public enterprise, firm, and/or organization.

The resources 104, 106, 108, 110, 112, 114, 116, 118 of this example are cloud resources. For example, the resources 104, 106, 108, 110, 112, 114, 116, 118 may be any addressable physical or virtual device part of a cloud computing environment or any non-addressable physical or virtual component part of the cloud computing environment. Addressable physical or virtual devices may be interconnected by one or more computer networks (e.g., cloud computer networks) and each device may have one or more addresses on the computer network(s). Each address may be of any suitable type and may be used to enable communication to/from a device on the computer network(s). Non-limiting examples of addresses include an Internet Protocol (IP) address (e.g., an IPv4 or an IPv6 address), a media access control (MAC) address, a file transfer protocol (FTP) address, a HyperText Transfer Protocol (HTTP) address, and a hostname.

As used herein, a "network resource" refers to a resource, such as a cloud resource, that is addressable and/or otherwise may be reachable via one or more network connections and/or one or more computer networks. For example, the VM 116 can be a network resource because it has one or more network connections to other resources, such as to the router 108 and the load balancer 112. Likewise, the load balancer 112 can be a network resource because it has one or more network connections to other resources, such as the router 108 and the VMs 116, 118. In some embodiments, the VM 116 and the load balancer 112 can be network resources because they can be respectively accessed via the at least one network 126. As used herein, a "network connection" refers to a data and/or logical connection between resources. For example, the connection between the router 108 and the VM 116 can be a network connection.

Non-addressable physical or virtual components are not interconnected by one or more computer networks. For example, non-addressable physical or virtual components may be part of the cloud computing environment but not reachable via an address. Non-limiting examples of non-addressable physical or virtual components include a physical or virtual firewall and a security group associated with a cloud instance (e.g., a virtual server, a VM).

In the illustrated example, the resources 104, 106, 108, 110, 112, 114, 116, 118 are virtual resources. For example, the resources 104, 106, 108, 110, 112, 114, 116, 118 may be virtualizations of physical hardware resources, such as virtualizations of computer servers (e.g., blade servers, rack-mounted servers) and/or aggregation(s), portion(s), or slice(s) thereof. Non-limiting examples of virtual resources include a standalone virtual machine (VM) (e.g., a standalone VM resource) such as VMs 116, 118 shown in FIG. 1A, an instance of a group VM resource, gateways such as gateway 106, routers such as routers 108, 110, load balancers such as load balancer 112, workers such as workers 114, and datastores such as datastore 104. Any other type of virtual resource is contemplated such as a container. A virtual machine, such as the VMs 116, 118 shown in FIG. 1A may virtualize an entire machine down to the hardware layers while a container may virtualize only software layers above the operating system level. Non-limiting examples of a group VM resource include an autoscaling group resource, an Elastic Kubernetes Service (EKS) cluster resource, an Elastic Container Service (ECS) cluster resource, an Elastic MapReduce (EMR) cluster resource, a managed instance group, and any resource part of a group of resources that share a common configuration.

Additionally or alternatively, the computing environment 100 may include physical resources (e.g., physical hardware resources). Non-limiting examples of physical resources include a desktop computer, a rack-mounted computer, a server, a network switch, a network router, a repeater, or any other network-enabled piece of equipment (e.g., a printer, scanner, a peripheral, etc.). In some embodiments, the computing environment 100 may include physical portable devices. Non-limiting examples of physical portable devices include network-enabled portable devices such as a smartphone, a smartwatch, a tablet computer, a laptop, a speaker, or any other suitable network-enabled mobile device.

In the illustrated example of FIG. 1A, users 122, 124 may access and/or otherwise interact with the computing environment 100 via at least one network 126. The at least one network 126 may be implemented by any wired and/or wireless network(s) such as one or more cellular networks (e.g., 4G LTE cellular networks, 5G cellular networks, future generation 6G cellular networks, etc.), one or more data buses, one or more local area networks (LANs), one or more optical fiber networks, one or more private networks, one or more public networks, one or more satellite networks, one or more wireless local area networks (WLANs), etc., and/or any combination(s) thereof. For example, the at least one network 126 may be the Internet, but any other type of private and/or public network is contemplated.

The users 122, 124 of this example have different motivations for accessing and/or otherwise interacting with the computing environment 100. For example, an approved user 122 may be issued credentials (e.g., access credentials, login credentials, security credentials) by the cloud provider 120 and/or an organization (e.g., an agency, a business, an enterprise) engaged with the cloud provider 120 to provide the computing environment. In such an example, the approved user 122 has permission to change, modify, and/or use the computing environment 100 in accordance with a permission and/or security level assigned to the approved user 122.

Contrary to the approved user 122, the malicious actor 124 does not have permission and/or otherwise is not granted access to the computing environment 100. For example, the malicious actor 124 may be a computer hacker motivated to disrupt normal operation of application(s) and/or service(s) implemented by the computing environment. In the shown example, the malicious actor 124 has improperly gained access to the computing environment 100 by exploiting an attack vector. For example, the malicious actor 124 may gain access to one(s) of the resources 104, 106, 108, 110, 112, 114, 116, 118 and/or, more generally, the computing environment 100, by obtaining credentials, such as those of the approved user 122. In such an example, the malicious actor 124 may obtain the credentials by either easily determining them (e.g., password guessing, a dictionary attack) or through misleading means such as phishing the approved user 122 and/or, more generally, obtaining them through social engineering in connection with the approved user 122. In addition, the malicious actor 124 may access one(s) of the resources 104, 106, 108, 110, 112, 114, 116, 118 by exploiting a misconfiguration of such resource(s). Additionally or alternatively, the malicious actor 124 may access one(s) of the resources 104, 106, 108, 110, 112, 114, 116, 118 by decrypting suboptimal encryption of the resource(s) and/or taking advantage of a resource that allows access to sensitive data via privilege escalation.

In the illustrated example, the attack path 102 is represented as a visualization of the attack vector utilized by the malicious actor 124. The attack path 102 of this example includes accessing the computing environment 100 via the at least one network 126 and the cloud provider 120. The attack path 102 of this example includes several hops to the target of the malicious actor 124, which in this example is the datastore 104. For example, the datastore 104 may store business trade secrets, financial information, personal identifiable information (PII), and/or any other information of interest to a non-approved user. The several hops of the shown attack path 102 include the gateway 106 (identified by A—GATEWAY), one of the routers 108 (identified by B—ROUTER), the load balancer 112 (identified by C—LOAD BALANCER), one of the VMs 118 (identified by D—VULNERABLE VM), and the datastore 104 (identified by E—DATASTORE). The attack path 102 shown in FIG. 1A is merely an example and may include fewer or more hops and/or may include any other combination of the resources 104, 106, 108, 110, 112, 114, 116, 118.

In the illustrated example, at least part of the attack vector utilized by the malicious actor 124 includes exploiting a vulnerable VM, which is shown in FIG. 1A as one of the VMs 116, 118. For example, the vulnerable VM 118 may have a security vulnerability such as by being misconfigured that enables improper access to the VM 118. Additionally or alternatively, the vulnerable VM 118 may have security vulnerabilities such as having out-of-outdate or not-up-to-date software, suboptimal encryption, and/or weak or easily discernable security credentials. For example, the malicious actor 124 may exploit one(s) of the security risks of the VM 118 to control the VM 118 in furtherance of the goals and/or motivations of the malicious actor 124, which in this example is at least accessing the data and/or information stored in the datastore 104.

Preventing such exploit(s) by malicious actors is an important consideration and goal for user(s) responsible for security computing environments such as the computing environment 100 of FIG. 1A. Beneficially, the techniques developed by the inventors as described herein may be used to prevent such exploit(s) in a computationally efficient manner and/or with a reduced physical hardware resource requirement.

FIG. 1B shows generating an example graphical representation 130 of the computing environment 100 of FIG. 1A using a graphical representation generator 131. The graphical representation generator 131 may be implemented by hardware alone, or by a combination of hardware, software, and/or firmware. For example, the graphical representation generator 131 may be implemented by one or more programmable processors executing a graph library. Non-limiting examples of programmable processors include central processing units (CPUs), digital signal processors (DSPs), graphics processing units (GPUs), and field programmable gate arrays (FPGAs). Non-limiting examples of graph libraries include graph-tool, igraph, NetworkX, and SNAP.

By way of example, the graphical representation generator 131 may obtain data about virtual resources 134 from the cloud provider 120 of FIG. 1A. The virtual resources 134 of FIG. 1B may include and/or correspond to one(s) of the resources 104, 106, 108, 110, 112, 114, 116, 118 of FIG. 1A. For example, the data may include metadata indicating values of attributes of one(s) of the resources 104, 106, 108, 110, 112, 114, 116, 118 of FIG. 1A.

Furthering the example, the graphical representation generator 131 builds the graphical representation 130 based on the data from the cloud provider 120. For example, the graphical representation generator 131 may generate the graphical representation 130 as a graph (e.g., a graph model, a graph representation) including a plurality of nodes and edges. The plurality of nodes includes processed graph nodes 136 (identified by solid line circles) and nodes to be processed 138 (identified by dashed line circles).

The processed graph nodes 136 represent ones of the virtual resources 134 whose network connections to other virtual resources 134 have been identified and represented as edges (e.g., graph edges). In this example, ones of the processed graph nodes 136 labeled "A", "B", "C", and "D" may correspond to the gateway 106, the first one of the routers 108, the load balancer 112, and the vulnerable VM 118 of FIG. 1A, respectively.

The nodes to be processed 138 represent ones of the virtual resources 134 whose corresponding network connections have not yet been identified. For example, the nodes to be processed 138 may represent ones of the virtual resources 134 not yet processed by the graphical representation generator 131. In this example, the node labeled "E" of the nodes to be processed 138 may correspond to the datastore 104 of FIG. 1A.

In the illustrated example of FIG. 1B, the graphical representation generator 131 is unable to generate and/or output an entirety of the graphical representation 130 in an efficient amount of time and via an efficient use of physical hardware resources. For example, the graphical representation generator 131 may be unable to scale with a computing environment as the computing environment increases in size (e.g., a number of virtual resources) and/or complexity (e.g., a number of different types of virtual resources, a number of network connections among the virtual resources, a number and/or type of different applications and/or services to be executed). In such an example, a computing system, such as a computing system associated with a user responsible for security of a computing environment, may lack sufficient physical hardware resources necessary to generate the graphical representation 130 in its entirety while satisfying time and/or physical hardware resource constraints.

FIG. 1C shows the generation of another graphical representation 140 of the computing environment 100 of FIG. 1A using a graphical representation generator 132 and a relational representation generator 142. The graphical representation generator 132 may be implemented by hardware alone, or by a combination of hardware, software, and/or firmware. For example, the graphical representation generator 132 may be implemented by one or more programmable processors executing a graph library. In some embodiments, the graphical representation generator 132 may be configured to obtain a relational representation as input as described below.

The relational representation generator 142 may be implemented by hardware alone, or by a combination of hardware, software, and/or firmware. For example, the relational representation generator 142 may be implemented by one or more programmable processors executing machine-readable and/or executable instructions to cause the one or more programmable processors to output a relational representation of a computing environment, or portion(s) thereof.

By way of example, the relational representation generator 142 may obtain data about the virtual resources 134 of FIG. 1B from the cloud provider 120 of FIG. 1A and/or 1B (identified by "CLOUD PROVIDER 1" in FIG. 1C). For example, the data may include metadata indicating values of attributes of one(s) of the resources 104, 106, 108, 110, 112, 114, 116, 118 of FIG. 1A. Additionally or alternatively, the relational representation generator 142 may obtain data about virtual resources 144 from a different cloud provider 146 (identified by "CLOUD PROVIDER N" in FIG. 1C). Additionally or alternatively, the relational representation generator 142 may be in communication with and/or obtain data from fewer or more cloud providers than depicted in FIG. 1C.

Furthering the example shown in FIG. 1C, the relational representation generator 142 can build and/or generate a relational representation of ones of the virtual resources 134 and/or, more generally, the computing environment 100 of FIG. 1A, or portion(s) thereof, based on the data from the cloud provider 120. In some embodiments, the relational representation generator 142 can build and/or generate (i) a first relational representation of ones of the virtual resources 134 and/or, more generally, the computing environment 100 of FIG. 1A, or portion(s) thereof, based on data from the cloud provider 120 and/or (ii) a second relational representation of ones of the virtual resources 144 and/or, more generally, a different computing environment than the computing environment 100 of FIG. 1A, or portion(s) thereof, based on data from the cloud provider 146. In some such embodiments, ones of the virtual resources 134 may be configured to exchange data with and/or be in communication with ones of the virtual resources 144 via the cloud providers 120, 146.

In some embodiments, the relational representation generator 142 can generate the relational representation as at least one table. For example, the relational representation generator 142 can obtain metadata indicating a set of virtual resources in the plurality of virtual resources 134 and network connections among virtual resources in the set of virtual resources. In some such embodiments, the relational representation generator 142 can generate a first table to indicate values of attributes of individual virtual resources in the set of virtual resources. The relational representation generator 142 can generate a second table to indicate values of attributes of network connections among the virtual resources in the set of virtual resources. The relational representation generator 142 can generate a third table to indicate values of attributes of a plurality of network paths between the virtual resources in the set of virtual resources. For example, the relational representation generator 142 can perform a graph traversal technique using at least one of the first table or the second table to generate the plurality of network paths. As used herein, the terms "path" and "network path" are used interchangeably and refer to one or more connections (e.g., data connections, network connections, logical connections) between a pair of graph nodes. In some embodiments, a network path may include one or more nodes between the pair of graph nodes. The relational representation generator 142 can store at least one of the first table, the second table, or the third table in at least one datastore.

In some embodiments, the graphical representation generator 132 can generate and/or output the graphical representation 140 by using one(s) of the tables, or portion(s) thereof. For example, the graphical representation generator 132, using at least the data in the first table, can generate nodes 148 of the graphical representation 140 to represent respective ones of the virtual resources 134. In some embodiments, the graphical representation generator 132, using at least the data in the second table, can generate a plurality of paths 150 of the graphical representation 140. The plurality of paths 150 of this example are network paths. Also depicted are edges 151 between pairs of the nodes 148.

The graph nodes 148 of FIG. 1C are processed graph nodes 136 that represent ones of the virtual resources 134 whose network connections to other virtual resources 134 have been identified and represented as edges (e.g., graph edges). In this example, ones of the processed graph nodes 136 labeled "A", "B", "C", "D", and "E" may correspond to the gateway 106, the first one of the routers 108, the load balancer 112, the vulnerable VM 118, and the datastore 104 of FIG. 1A, respectively.

Beneficially, and as shown in the illustrated example, an entire of the nodes 148 are processed compared to the graphical representation 130 of FIG. 1B. For example, by generating the graphical representation 140 using the relational representation, the graphical representation generator 131 of FIG. 1B may be improved by processing the virtual resources in the set of virtual resources in an efficient amount of time (e.g., with increased speed compared to FIG. 1B) and via an efficient use of physical hardware resources (e.g., with a reduced number of physical hardware resources compared to FIG. 1B). In such an embodiment, the graphical representation 140 may include one or more of the network paths 150 to node "E" whereas node "E" in the graphical representation 130 of FIG. 1B was not processed.

Beneficially, the graphical representation generator 132 of FIG. 1C, due at least in part to the relational representation generated by the relational representation generator 142, is able to scale with a computing environment as the computing environment increases in size (e.g., a number of virtual resources) and/or complexity (e.g., a number of different types of virtual resources, a number of network connections among the virtual resources, a number and/or type of different applications and/or services to be executed). For example, the relational representation generator 142 may be used to process virtual resources for a plurality of cloud providers, such as the cloud providers 120, 146 of FIG. 1C in an efficient amount of time and/or via an efficient use of physical hardware resources.

Furthering the example of FIG. 1C, the graphical representation 140 depicts at least one attack path 152, which is represented by dotted lines from node "A" to node "E" via nodes "B", "C", and "D". For example, as described below in further detail in FIG. 2, the relational representation may be used to identify, from among the plurality of network paths 150 and using the relational representation and information indicating one or more of the plurality of virtual resources that have at least one respective security vulnerability, one or more network attack paths (e.g., the at least one attack path 152) that may be used to exploit one or more security vulnerabilities of virtual resources in the set of virtual resources. Beneficially, because the relational representation 140 is generated in an efficient amount time and/or via an efficient use of physical hardware resources, attack paths such as the at least one attack path 152 shown in FIG. 1C can be identified and analyzed whereas no such attack paths are identified in the graphical representation 130 of FIG. 1B. As used herein, the terms "attack path" and "network attack path" are used interchangeably and refer to one or more connections (e.g., data connections, network connections, logical connections) between a pair of graph nodes that may be used to exploit one or more security vulnerabilities of one or more resources in a set of resources represented by at least the pair of graph nodes. In some embodiments, an attack path between a pair of graph nodes may include one or more nodes between the pair of graph nodes.

FIG. 2 shows an example implementation of an attack path analysis software application 200 including the relational representation generator 142 and the graphical representation generator 132 of FIG. 1C. In some embodiments, the attack path analysis software application 200 may be used to identify at least one node representing a resource having at least one respective security vulnerability. In some embodiments, the attack path analysis software application may identify, from one or more paths including the at least one node and using at least one portion of a relational representation associated with the resource, one or more attack paths.

The relational representation generator 142 of the illustrated example includes a network interface module 202, a computing environment evaluation module 204, a datastore interface module 206, a network path identification module 208, and an attack path identification module 210. The relational representation generator 142 of this example includes the network interface module 202 to receive and/or transmit data and/or information. For example, the network interface module 202 may receive, via at least one network, information including metadata from the cloud provider 120 of FIGS. 1A-1C. In some embodiments, the network interface module 202 may transmit, via the at least one network, data and/or information to the cloud provider 120, such as a request for information about resources hosted and/or managed by the cloud provider 120.

The network interface module 202 of FIG. 2 may receive metadata from a cloud provider and output the metadata, or processed portion(s) thereof, as computing environment metadata 212 to the computing environment module 204. For example, the computing environment metadata 212 may include information indicating values of attributes about the computing environment 100 of FIG. 1A. In some such embodiments, the computing environment metadata 212 may include information indicating values of attributes about the cloud provider 120, one(s) of the resources 104, 106, 108, 110, 112, 114, 116, 118, and/or network connection(s) among the one(s) of the resources 104, 106, 108, 110, 112, 114, 116, 118 of FIG. 1A.

In some embodiments, the computing environment evaluation module 204 processes the computing environment metadata 212 to identify resources and network connections among the resources 214. For example, the computing environment evaluation module 204 can identify and/or extract data from the computing environment metadata 212 as cloud provider metadata, resource metadata, and/or network connection metadata.

In some embodiments, the computing environment evaluation module 204 can generate a relational representation of a computing environment, such as the computing environment 100 of FIG. 1A, or portion(s) thereof, using the computing environment metadata 212. For example, the computing environment evaluation module 204 may extract the cloud provider metadata from the computing environment metadata 212. In some such embodiments, the cloud provider metadata may include values of attributes of the cloud provider 120. Non-limiting examples of values of attributes about the cloud provider 120 include the name of the cloud provider 120 and a user provided name for an account and/or profile associated with the cloud provider 120. In some embodiments, the computing environment evaluation module 204 can store the cloud provider metadata in at least one first table. An example implementation of the at least one first table is shown in FIG. 3A. For example, the computing environment evaluation module 204 can generate a relational representation of information about the cloud provider 120 as a cloud provider table 300 shown in FIG. 3A.

In some embodiments, the computing environment evaluation module 204 can extract the resource metadata from the computing environment metadata 212. In such embodiments, the resource metadata may include values of attributes of one(s) of the resources 104, 106, 108, 110, 112, 114, 116, 118. Non-limiting examples of values of attributes about the one(s) of the resources 104, 106, 108, 110, 112, 114, 116, 118 include an IP address and/or IP port number, a resource identifier uniquely identifying the resource, and a type of resource. In some embodiments, the computing environment evaluation module 204 can store the resource metadata in at least one second table. An example implementation of the at least one second table is shown in FIG. 3B. For example, the computing environment evaluation module 204 can generate a relational representation of information about one(s) of the resources 104, 106, 108, 110, 112, 114, 116, 118 as a resource table 310 shown in FIG. 3B.

In some embodiments, the computing environment evaluation module 204 can extract the network connection metadata from the computing environment metadata 212. In some such embodiments, the network connection metadata may include values of attributes of network connections among the resources 104, 106, 108, 110, 112, 114, 116, 118. Non-limiting examples of values of attributes about the network connection(s) among the one(s) of the resources 104, 106, 108, 110, 112, 114, 116, 118 include identifications and/or labels of respective network connections between pairs of resources, text descriptions of the network connections, an identifier of a source resource for respective network connections, and an identifier of a target resource (e.g., a destination resource) for respective network connections. In some embodiments, the computing environment evaluation module 204 can store the network connection metadata in at least one third table. An example implementation of the at least one third table is shown in FIG. 3C. For example, the computing environment evaluation module 204 can generate a relational representation of information about the network connections among the resources 104, 106, 108, 110, 112, 114, 116, 118 as a network connection table 320 shown in FIG. 3C.

In the illustrated example, the computing environment evaluation module 204 can output the relational representation of the computing environment 100 of FIG. 1A, or portion(s) thereof such as the resources and network connections 214, to the datastore interface module 206. For example, the datastore interface module 206 may receive the at least one first table including information about the cloud provider 120, the at least one second table including information about one(s) of the resources 104, 106, 108, 110, 112, 114, 116, 118, and/or the at least one third table including information about network connections among the resources 104, 106, 108, 110, 112, 114, 116, 118 from the computing environment evaluation module 204.

In the illustrated example, the datastore interface module 206 can store the at least one first table, the at least one second table, and/or the at least one third table in at least one datastore 216. For example, the datastore interface module 206 can store information 218, which may include information about the cloud provider 120, one(s) of the resources 104, 106, 108, 110, 112, 114, 116, 118, and/or network connections among the resources 104, 106, 108, 110, 112, 114, 116, 118 in the at least one datastore 216.

In some embodiments, the at least one datastore 216 can be implemented by any technology for storing data. For example, the at least one datastore 216 can be implemented by a volatile memory (e.g., a Synchronous Dynamic Random Access Memory (SDRAM), a Dynamic Random Access Memory (DRAM), a RAMBUS Dynamic Random Access Memory (RDRAM), etc.) and/or a non-volatile memory (e.g., flash memory). The at least one datastore 216 may additionally or alternatively be implemented by one or more double data rate (DDR) memories, such as DDR, DDR2, DDR3, DDR4, mobile DDR (mDDR), etc. The at least one datastore 216 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the at least one datastore 216 is illustrated as a single datastore, the at least one datastore 216 may be implemented by any number and/or type(s) of datastore. Furthermore, the data stored in the at least one datastore 216 may be in any data format. Non-limiting examples of data formats include a flat file, binary data, comma delimited data, tab delimited data, and structured query language (SQL) structures.

In some embodiments, the at least one datastore 216 may be implemented by a database system, such as one or more databases. The term "database" as used herein means an organized body of related data, regardless of the manner in which the data or the organized body thereof is represented. For example, the organized body of related data may be in the form of one or more of a table, a log, a map, a grid, a graph, a model, a packet, a datagram, a frame, a file, an e-mail, a message, a document, a report, a list or in any other form.

In the illustrated example, the datastore interface module 206 can provide the information 218, or portion(s) thereof, to the network path identification module 208. For example, the datastore interface module 206 can provide and/or relay the information 218 from the computing environment evaluation module 204 to the network path identification module 208. In some embodiments, the datastore interface module 206 can retrieve the information 218 from the at least one datastore 216. For example, the datastore interface module 206 can retrieve one or more portions of the information 218 from the at least one datastore 216 via one or more transactions (e.g., data processing transactions, datastore transactions). An example implementation of a transaction is a SQL transaction. In some embodiments, a SQL transaction is a grouping one of more SQL statements or queries that interact with the at least one datastore 216. For example, a SQL transaction may include one or more create, read, update, and/or delete (CRUD) SQL operations in connection with the at least one datastore 216.

In some embodiments, the network path identification module 208 can generate and/or identify network paths 220 from the information 218, or portion(s) thereof. For example, the network path identification module 208 can apply a graph traversal technique to information about a cloud provider, resources hosted by the cloud provider, and/or network connections among the resources to generate the network paths 220, which can represent paths between the resources. For example, the network path identification module 208 applying the graph traversal technique to generate the paths 220 may be implemented by performing a breadth first search, a depth first search, or a combination of breadth first search and depth first search to generate the plurality of paths.

In some embodiments, the network path identification module 208 may determine and/or identify an entirety of the paths 150 of FIG. 1C using a breadth first search. For example, the network path identification module 208 may start at a particular node, such as node "A" of the graphical representation 140, and explore branches (e.g., network connections, logical connections) at the same depth at node "A" prior to moving on to exploring branches at nodes at the next depth level. In some embodiments, the network path identification module 208 may determine and/or identify an entirety of the paths 150 of FIG. 1C using a depth first search. For example, the network path identification module 208 may start at the root node, which may be node "A" of the graphical representation 140. In some such embodiments, the network path identification module 208 may explore as far as possible along each branch before backtracking and exploring a branch from another node.

In some embodiments, the network path identification module 208 may determine and/or identify ones of the paths 150 of FIG. 1C using a combination of breadth first search and depth first search. For example, the network path identification module 208 may select a node from a set of the nodes 148. In some such embodiments, the network path identification module 208 may perform a depth search from the selected node to one or more hops (e.g., 1 hop, 3 hops, 5 hops, 10 hops) beyond the selected node. After the one or more hops, the network path identification module 208 may perform a breadth search by backtracking and selecting another node from the set of the nodes 148 from which to explore connections. The network path identification module 208 may iteratively proceed through the nodes in the set of the nodes 148 until the set of the nodes 148 has been evaluated. The network path identification module 208 may then proceed to use a combination of breadth first search and depth first search on another set of the nodes 148.

In some embodiments, the network path identification module 208 can store information indicating the network paths 220 in at least one fourth table. An example implementation of the at least one fourth table is shown in FIG. 3D. For example, the network path identification module 208 can generate a relational representation of information about the network paths 150 between the nodes 148 as a network path table 330 shown in FIG. 3D.

In the illustrated example, the network path identification module 208 can output the network paths 220 to the datastore interface module 206. For example, the network path identification module 208 may output the at least one fourth table to the datastore interface module 206. In some embodiments, the datastore interface module 206 may store the at least one fourth table in the at least one datastore 216. In some embodiments, the datastore interface module 206 may output portion(s) of the at least one fourth table to the attack path identification module 210.

In the illustrated example, the attack path identification module 210 can identify and/or output attack paths 222 based on the network paths 220. For example, the attack path identification module 210 may determine at least one of the virtual resources 134 of FIGS. 1B-1C has a respective security vulnerability. In some embodiments, the attack path identification module 210 may determine that at least one portion of the relational representation corresponding to the at least one of the virtual resources 134 conforms to a respective attack path definition (e.g., a network attack path definition) defining the respective security vulnerability. As used herein, the terms "attack path definition" and "network attack path definition" are used interchangeably and refer to a set of circumstances, conditions, and/or parameters characterizing a security vulnerability that, when present and/or satisfied in connection with a resource, indicate that the resource has the security vulnerability. For example, the attack path identification module 210 may identify a first virtual resource of the virtual resources 134 having a security vulnerability by determining that portion(s) of the cloud provider table 300, the resource table 310, the network connection table 320, or the network path table 330 corresponding to the first virtual resource conform to an attack path definition defining the security vulnerability. In some embodiments, the attack path identification module 210, using portion(s) of the network path table 330 corresponding to the first virtual resource, may identify one or more of the network paths 220 as one or more of the attack paths 222 that may be used to exploit the security vulnerability of the first virtual resource.

In some embodiments, the attack path identification module 210 can store information indicating the attack paths 222 in at least one fifth table. Example implementations of the at least one fifth table are shown in FIGS. 4A-4C. For example, the attack path identification module 210 can generate a relational representation of information about the attack path 152 of FIG. 1C between node "A" and node "E" as one(s) of the attack path tables 410, 420, 430 shown in FIGS. 4A-4C.

In the illustrated example, the attack path identification module 210 can output the attack paths 222 to the datastore interface module 206. For example, the attack path identification module 210 may output the at least one fifth table to the datastore interface module 206. In some embodiments, the datastore interface module 206 may store the at least one fifth table in the at least one datastore 216.

In some embodiments, the datastore interface module 206 may output a relational representation of a computing environment, or portion(s) thereof, to the graphical representation generator 132. In some embodiments, the graphical representation generator 132 can generate a graph or a subgraph representing a computing environment, or portion(s) thereof. For example, the graphical representation generator 132, using at least one portion of the relational representation of the computing environment 100, may generate the graphical representation 140 of FIG. 1C. In some such embodiments, the graphical representation generator 132 may output the graphical representation 140 to a graphical user interface (GUI) module 224. In some embodiments, the graphical representation generator 132 may generate the graphical representation 140 using the NetworkX graph library. Alternatively, the graphical representation generator 132 may generate the graphical representation 140 using any other graph library and/or graph generation technique.

In the illustrated example of FIG. 2, the attack path analysis software application 200 includes the GUI module 224 to generate at least one GUI for presentation, such as for presentation to a user. For example, a user may interact with the GUI module 224, and/or, more generally, the attack path analysis software application 200, via at least one GUI displayed and/or presented on at least one display device of at least one electronic device. For example, a user may interface with the attack path analysis software application 200 by touching a touchscreen display presenting at least one GUI, using a mouse and/or keyboard to interact with the at least one GUI, a voice recognition system to interact with the at least one GUI, etc., and/or any combination(s) thereof.

In some embodiments, the GUI module 224 may generate at least one GUI including at least one visualization of a graph (e.g., a graph representation) representing at least a portion of the computing environment. For example, the GUI module 224 may generate a GUI including a visualization of the graphical representation 140 of FIG. 1C. In some embodiments, the GUI module 224 may generate the GUI to include the visualization of the graphical representation 140 and information indicating that one or more attack paths, such as the attack path 152, may be used to exploit one or more security vulnerabilities of one(s) of network resources represented by nodes "A", "B", "C", "D", and/or "E".

In some embodiments, the GUI module 224 can generate the GUI by generating at least one GUI element containing content indicating an explanation for why the one or more network attack paths, such as the attack path 152, are identified as attack paths. For example, the GUI module 224 may generate at least one GUI element containing text statement(s), icon(s), and/or other information to convey to a user why the attack path 152 is identified as an attack path.

In some embodiments, the GUI module 224 can generate the GUI by generating at least one GUI element containing content indicating one or more operations actionable by a user to at least one of mitigate or resolve at least one security vulnerability of at least one respective vulnerable network resource along one or more attack paths. For example, the GUI module 224 can generate the GUI by generating at least one GUI element containing content providing instructions to at least one of mitigate or resolve a security vulnerability. Non-limiting examples of mitigating and/or resolving a security vulnerability include upgrading outdated or not-up-to-date software, changing configuration(s) to correct misconfiguration(s) of a resource (e.g., reconfigure a resource), strengthening and/or changing suboptimal encryption of a resource, and strengthening and/or changing weak or easily discernable security credentials.

While an example implementation of the attack path analysis software application 200 is depicted in FIG. 2, other implementations are contemplated. For example, one or more blocks, components, functions, etc., of the attack path analysis software application 200 may be combined or divided in any other way. The attack path analysis software application 200 of the illustrated example may be implemented by hardware alone, or by a combination of hardware, software, and/or firmware. For example, the attack path analysis software application 200 may be implemented by one or more analog or digital circuits (e.g., comparators, operational amplifiers, etc.), one or more hardware-implemented state machines, one or more programmable processors (e.g., central processing units (CPUs), DSPs, FPGAs, GPUs, etc.), one or more network interfaces (e.g., network interface circuitry, network interface cards (NICs), smart NICs, etc.), one or more application specific integrated circuits (ASICs), one or more memories (e.g., non-volatile memory, volatile memory, etc.), one or more mass storage disks or devices (e.g., HDDs, SSD drives, etc.), etc., and/or any combination(s) thereof.

FIG. 3A shows an example implementation of the cloud provider table 300 containing information indicating values of attributes of cloud provider(s) associated with the computing environment 100 of FIG. 1A. For example, the cloud provider table 300 can implement a relational representation of information about one or more cloud providers, such as the cloud providers 120, 146 of FIG. 1C.

In the illustrated example, each row of the cloud provider table 300 may be a record with a unique identifier (identified by CLOUD PROVIDER TABLE ID). In some embodiments, the unique identifier is called a key (e.g., a primary key). For example, the cloud provider table ID may be a SQL primary key that uniquely identifies each record in the cloud provider table 300. In some such embodiments, the cloud provider table ID may be used to fetch and/or retrieve records/data rows from the cloud provider table 300. Additionally or alternatively, any other record, or portion(s) thereof, of the cloud provider table 300 may be a SQL primary key. The cloud provider table 300 of this example also contains information about user provided names and cloud providers, such as user provided name attributes and cloud provider attributes. For example, the user-provided name be a name supplied by a user to identify (e.g., uniquely identify) an account with a particular cloud provider.

FIG. 3B shows an example implementation of the resource table 310 containing information indicating values of attributes of resources associated with the computing environment 100 of FIG. 1A. For example, the resource table 300 can implement a relational representation of information about one or more resources, such as one(s) of the resources 104, 106, 108, 110, 112, 114, 116, 118 of FIG. 1A, one(s) of the virtual resources 134 of FIG. 1B, and/or one(s) of the virtual resources 144 of FIG. 1C.

In the illustrated example, each row of the resource table 300 may be a record with a unique identifier (identified by RESOURCE TABLE ID). For example, the resource ID may be a SQL primary key that uniquely identifies each record in the resource table 300. In some such embodiments, the resource table ID may be used to fetch and/or retrieve records/data rows from the resource table 300. Additionally or alternatively, any other record, or portion(s) thereof, of the resource table 300 may be a SQL primary key. The resource table 300 of this example also contains information about the cloud provider hosting and/or managing the resource (e.g., a cloud provider attribute), a unique identifier that identifies the resource (identified by RESOURCE ID) (e.g., a resource ID attribute), and a type of the resource (e.g., a resource type attribute).

FIG. 3C shows an example implementation of the network connection table 320 containing information indicating values of attributes of network connections associated with the computing environment 100 of FIG. 1A. For example, the network connection table 320 can implement a relational representation of information about network connections among one or more resources, such as one(s) of the resources 104, 106, 108, 110, 112, 114, 116, 118 of FIG. 1A, one(s) of the virtual resources 134 of FIG. 1B, and/or one(s) of the virtual resources 144 of FIG. 1C. For example, the network connection table 320 may contain information about a network connection between the gateway 106 and the router 108 of FIG. 1A, connections between the load balancer 112 and the VMs 116, 118, etc.

In the illustrated example, each row of the network connection table 320 may be a record with a unique identifier (identified by NC TABLE ID). For example, the NC table ID may be a SQL primary key that uniquely identifies each record in the network connection table 320. In some such embodiments, the NC table ID may be used to fetch and/or retrieve records/data rows from the network connection table 320. Additionally or alternatively, any other record, or portion(s) thereof, of the network connection table 320 may be a SQL primary key. The network connection table 320 of this example also contains information about the cloud provider including and/or implementing the network connection, a text label of the network connection, a status of the network connection, a text description providing details about the network connection, a unique identifier that identifies a source (e.g., an origin) of the network connection (identified by SOURCE RESOURCE ID), and a unique identifier that identifies a target (e.g., a destination) of the network connection.

By way of example, the first entry of the network connection table 320 has an NC table ID of 1 and is hosted by cloud provider 1, which may be the cloud provider 120. The network connection corresponding to NC table ID 1 has a label of internet gateway→router, which indicates that the network connection may be from the gateway 106 of FIG. 1A to the router 108 of FIG. 1A. The network connection table 320 provides details for this network connection of "The internet gateway uses a route table of the router." to explain the relationship between the gateway 106 and the router 108 and/or provide a rationale why such a relationship is contained in the network connection table 320. NC table ID 1 also provides a source resource ID of 28 and a target resource ID of 41. For example, such IDs may indicate that the gateway 106 is the source of the network connection and has a unique identifier of 28 and the router 108 is the target of the network connection and has a unique identifier of 41.

FIG. 3D shows an example implementation of the network path table 330 containing information indicating values of attributes of network paths associated with the computing environment 100 of FIG. 1A. For example, the network path table 330 can implement a relational representation of information about network paths between resources, such as one(s) of the resources 104, 106, 108, 110, 112, 114, 116, 118 of FIG. 1A, one(s) of the virtual resources 134 of FIG. 1B, and/or one(s) of the virtual resources 144 of FIG. 1C. For example, the network path table 330 may contain information about a network path between the gateway 106 and the datastore 104 of FIG. 1A and/or the network paths 150 of FIG. 1C.

In the illustrated example, each row of the network path table 330 may be a record with a unique identifier (identified by NETWORK PATH TABLE ID). For example, the network path table ID may be a SQL primary key that uniquely identifies each record in the network path table 330. In some such embodiments, the network path table ID may be used to fetch and/or retrieve records/data rows from the network path table 330. Additionally or alternatively, any other record, or portion(s) thereof, of the network path table 330 may be a SQL primary key. The network path table 330 of this example also contains information about the cloud provider including and/or implementing the network path, a type of the network path, a length of the network path, resource IDs of resources in the network path.

By way of example, the first entry of the network path table 330 has a network path table ID of 1 and is hosted by cloud provider 1, which may be the cloud provider 120. The network path corresponding to network path table ID 1 has a type of internet gateway→datastore, which indicates that the network path may be from the gateway 106 of FIG. 1A to the datastore 104 of FIG. 1A. The network path length of network path table ID 1 is 5, which indicates that there are 5 hops between the gateway 106 and the datastore 104 of FIG. 1A. The resource IDs for the resources in the network path identified by network path table ID 1 are 28, 41, 89, 125, 157, 296. For example, such IDs may indicate that the gateway 106 has a unique identifier of 28, the router 108 has a unique identifier of 41, the load balancer 112 has a unique identifier of 89, the VM 118 has a unique identifier of 125, and the datastore 104 has a unique identifier of 157.

FIG. 3E shows an example implementation of a network path component table 340 containing information indicating values of attributes of cloud providers, network connections, and network paths associated with the computing environment 100 of FIG. 1A. For example, the network path component table 340 can implement a relational representation of information about cloud providers, network connections among resources, and network paths between resources, such as one(s) of the resources 104, 106, 108, 110, 112, 114, 116, 118 of FIG. 1A, one(s) of the virtual resources 134 of FIG. 1B, and/or one(s) of the virtual resources 144 of FIG. 1C. For example, the network path component table 340 may contain information about components, portions, and/or segments of a network path between the gateway 106 and the datastore 104 of FIG. 1A and/or the network paths 150 of FIG. 1C.

In the illustrated example, each row of the network path component table 340 may be a record with a unique identifier (identified by NPC TABLE ID). For example, the NPC table ID may be a SQL primary key that uniquely identifies each record in the network path component table 330. In some such embodiments, the NPC table ID may be used to fetch and/or retrieve records/data rows from the network path component table 340. Additionally or alternatively, any other record, or portion(s) thereof, of the network path component table 340 may be a SQL primary key. The network path component table 340 of this example also contains information about the network path containing the network path component, the cloud provider including and/or implementing the network path component, a type of the network component, an index of the network path for the network path component, a resource ID of the network path component, and a network connection ID of the network path component.

By way of example, the first entry of the network path component table 340 has an NPC table ID of 1, is contained in a network path that corresponds to network path table ID 1 of the network path table 330 of FIG. 3D, and is hosted by cloud provider 1, which may be the cloud provider 120. The network path component corresponding to NPC table ID 1 has a type of resource, which indicates that the network path component is a resource (and not a network connection). The resource has a network path index of 1, which indicates that the resource is the first hop in the network path (e.g., the first hop in the network path of network path table ID 1 containing resource IDs 28, 41, 89, 125, 127 of the network path table 330 of FIG. 3D). The resource of this example has a resource ID of 28 and does not have a network connection ID because it is not a network connection (and thereby does not have a network connection type).

Beneficially, the network path component table 340 may be used to process transactions in less time and/or with less physical hardware resources compared to conventional techniques. For example, processing a transaction, such as retrieving information about a resource, may typically involve loading an entire graphical representation of a computing environment that contains the resource into memory of a user's computing system. After loading the entire graphical representation into memory, which may substantially strain the user's computing system in doing so, the system may retrieve the requested information. Beneficially, the technology developed by the inventors may improve upon such processing of transactions. For example, the technology developed by the inventors may obtain a request for information related to a resource having a resource ID of 41. In some such embodiments, the technology developed by the inventors may involve querying the network path component table 340 using the NPC table ID of 1, which corresponds to the resource ID of 41. Beneficially, the technology developed by the inventors may involve returning the requested information in substantially less time and with substantially less physical hardware resources because the network path component table 340 may be queried instead of querying a data structure of the entire graphical representation.

FIG. 4A shows an example implementation of a network attack path table 400 containing information indicating values of attributes of network attack paths associated with the computing environment 100 of FIG. 1A. For example, the network attack path table 400 can implement a relational representation of information about network attack paths between resources, such as one(s) of the resources 104, 106, 108, 110, 112, 114, 116, 118 of FIG. 1A, one(s) of the virtual resources 134 of FIG. 1B, and/or one(s) of the virtual resources 144 of FIG. 1C. For example, the network attack path table 400 may contain information about a network attack path between at least the gateway 106 and the datastore 104 of FIG. 1A and/or the network attack path 152 of FIG. 1C.

In the illustrated example, each row of the network attack path table 400 may be a record with a unique identifier (identified by NETWORK ATTACK PATH TABLE ID). For example, the network attack path table ID may be a SQL primary key that uniquely identifies each record in the network attack path table 400. In some such embodiments, the network attack path table ID may be used to fetch and/or retrieve records/data rows from the network attack path table 400. Additionally or alternatively, any other record, or portion(s) thereof, of the network attack path table 400 may be a SQL primary key. The network attack path table 400 of this example also contains information about a risk score of the network attack path, a discovered timestamp of the network attack path, a resource ID of the first resource in the network attack path, a resource ID of the last resource in the network attack path, the cloud provider including and/or implementing the network attack path, a unique key of the network attack path, a name of the first resource in the network attack path, and a name of the last resource in the network attack path.

By way of example, the first entry of the network attack path table 400 has a network attack path table ID of 1 and is in a computing environment hosted by cloud provider 1, which may be the cloud provider 120. The risk score for this network attack path is 900. In some embodiments, the risk score may represent a degree to which the network attack path may be used to exploit a respective security vulnerability of at least one resource in the network attack path. The risk score of this example may be a value in a range of 0 to 1000, but any other value and/or range is contemplated. For example, a risk score of 0 for a network attack path may represent no risk, a risk score of 1000 may represent the most risk, and risk scores in between may represent different degrees of risk. In some embodiments, the risk score may be calculated based on one or more different considerations and/or parameters. For example, the attack path identification module 210 and/or, more generally, the attack path analysis software application 200, may generate and/or determine a risk score for a network attack path by evaluating one or more parameters associated with the network attack path.

In some embodiments, the attack path identification module 210 may determine a risk score by at least evaluating a category of attack vector that may utilize the network attack path. A non-limiting example of a category may be whether the network attack path contains a publicly exposed compute instance with at least one security vulnerability having a critical severity. Another non-limiting example of a category may be whether the network attack path contains a publicly exposed compute instance with at least one security vulnerability having a critical severity and the instance has access to PII data.

In some embodiments, the attack path identification module 210 may determine a risk score by at least evaluating an accessibility of a network attack path. For example, the attack path identification module 210 may determine a higher risk score for a network attach path if it is fully accessible (e.g., accessible by any IP address external to a computing environment). In some embodiments, the attack path identification module 210 may determine a higher risk score (but not necessarily as high as fully accessible) for a network attach path if it is partially accessible, such as by being accessible by an approved list of IP addresses for inbound traffic to a computing environment. In some embodiments, the attack path identification module 210 may determine a lower risk score for a network attack path if it is not accessible.

In some embodiments, the attack path identification module 210 may determine a risk score for a network attack path by at least evaluating risk scores for individual resources of the network attack path. For example, the attack path identification module 210 may assign a risk score to each resource in a network attack path. In some such embodiments, the attack path identification module 210 may assign a weight and/or scale factor to each risk score based on the corresponding resource's position (e.g., hop number) in the network attack path. For example, a resource closer to an Internet gateway may have a greater weight/scale factor than a resource further away from the Internet gateway. In some such embodiments, the attack path identification module 210 may combine the individual risk scores. For example, the attack path identification module 210 may add the individual risk scores and divide by the number of risk scores to determine a scaled risk score for the network attack path.

In some embodiments, the attack path identification module 210 may determine a risk score for a network attack path by at least evaluating a number of hops of the network attack path. For example, a network attack path with a greater number of hops may have a lower risk score than a network attack path with a lesser number of hops. In some such embodiments, a network attack path with a greater number of hops may have a low risk score because it may be difficult to pivot from resource to resource. Thusly, it may be increasingly difficult for a malicious actor to traverse along many resources rather than traverse along a network path that has a fewer number of resources.

In some embodiments, the attack path identification module 210 may determine a risk score for a network attack path by at least evaluating an age of a network attack path. For example, based on the discovered timestamp, the attack path identification module 210 may determine an age of the network attack path. In some such embodiments, the attack path identification module 210 may assign a higher risk score for older network attack paths than newer network attack paths. For example, older network attack paths may have high risk because a greater number of malicious actors may be aware of the network attack path. In some embodiments, newer network attack paths may have low risk because they are likely to be more secure due to a fewer number of malicious actors being aware of the network attack path.

In some embodiments, the attack path identification module 210 may determine a risk score based on a combination of one or more of the aforementioned parameters. For example, the attack path identification module 210 may determine a risk score based on at least one of an evaluation of a category of attack vector that may utilize a network attack path, an accessibility of the network attack path, risk scores for individual resources of the network attack path, a number of hops of the network attack path, or an age of the network attack path. In some embodiments, the attack path identification module 210 may rank network attack paths based on their respective risk scores and/or cause a ranking of the network attack paths to be output via at least one GUI.

FIG. 4B shows an example implementation of a network attack path resource table 410 containing information indicating values of attributes of resources in network attack paths associated with the computing environment 100 of FIG. 1A. For example, the network attack path resource table 410 can implement a relational representation of information about resources, such as one(s) of the resources 104, 106, 108, 110, 112, 114, 116, 118 of FIG. 1A, one(s) of the virtual resources 134 of FIG. 1B, and/or one(s) of the virtual resources 144 of FIG. 1C, in network attack paths such as the network attack path 102 of FIG. 1A and/or the network attack path 152 of FIG. 1C. For example, the network attack path resource table 410 may contain information about resources in the network attack path 102 of FIG. 1A, which may include at least the gateway 106 and the datastore 104 of FIG. 1A.

In the illustrated example, each row of the network attack path resource table 410 may be a record with a unique identifier (identified by NETWORK ATTACK PATH RESOURCE TABLE ID). For example, the network attack path resource table ID may be a SQL primary key that uniquely identifies each record in the network attack path resource table 410. In some such embodiments, the network attack path resource table ID may be used to fetch and/or retrieve records/data rows from the network attack path resource table 410. Additionally or alternatively, any other record, or portion(s) thereof, of the network attack path resource table 410 may be a SQL primary key. The network attack path resource table 410 of this example also contains information about a network attack path table ID corresponding to the resource, the cloud provider including and/or implementing the resource, an index of the network attack path, a resource identifier of the resource, a type of the resource, and any properties of the resource.

By way of example, a resource represented by the first entry of the network attack path resource table 410 is the Internet, has a network attack path resource table ID of 1, is contained in a network attack path that corresponds to network attack path table ID 1 of the network attack path table 400 of FIG. 4A, and the cloud provider in this example is the Internet (and not necessarily any particular cloud provider). For example, the resource may be the at least one network 126 of FIG. 1A. The resource has a network attack path index of 0, which may indicate that it is the origin of the network attack path. The resource has a resource ID of 7 and a type of the Internet.

By way of another example, a resource represented by the second entry of the network attack path resource table 410 is an Internet gateway, which may be the gateway 106 of FIG. 1A. The resource has a network attack path resource table ID of 2, is contained in a network attack path that corresponds to network attack path table ID 1 of the network attack path table 400 of FIG. 4A, and the cloud provider in this example is cloud provider 1, which may be the cloud provider 120 of FIG. 1A. The resource has a network attack path index of 1, which may indicate that it is the next hop in the network attack path after the Internet. The resource has a resource ID of 28 and a resource type of Internet gateway.

FIG. 4C shows an example implementation of a network attack path network connection table 420 containing information indicating values of attributes of network connections in network attack paths associated with the computing environment 100 of FIG. 1A.

In the illustrated example, each row of the network attack path network connection table 420 may be a record with a unique identifier (identified by NETWORK ATTACK NC TABLE ID). For example, the network attack path NC table ID may be a SQL primary key that uniquely identifies each record in the network attack path network connection table 420. In some such embodiments, the network attack path NC table ID may be used to fetch and/or retrieve records/data rows from the network attack path network connection table 420. Additionally or alternatively, any other record, or portion(s) thereof, of the network attack path network connection table 420 may be a SQL primary key. The network attack path network connection table 420 of this example also contains information about a network attack path table ID corresponding to the network connection, an index of the network attack path for the network connection, a text label, one or more properties, a resource identifier of a source resource of the network connection, the cloud provider for the source resource, a resource identifier of a target resource of the network connection, and the cloud provider for the target resource.

By way of example, a network connection represented by the first entry of the network attack path network connection table 420 has a network attack path NC table ID of 1 and is contained in and/or associated with a network attack path that corresponds to network attack path table ID 1 of the network attack path table 400 of FIG. 4A. The network connection has a label of "GOES_TO", which indicates that the network connection is established between the at least one network 126 and the gateway 106 because data traffic comes from the Internet. The properties may include one or more properties such as reasons why the network connection has the label "GOES_TO". For example, the properties may include text such as "Traffic comes from the Internet." to indicate that the network connection has the label "GOES_TO". The Internet of the network connection represented by the first entry has a source resource ID of 7 and the source cloud provider is the Internet. The target resource of the network connection, which may be the gateway 106 of FIG. 1A, has a target resource ID of 28 and is provided by cloud provider 1, which may be the cloud provider 120.

By way of another example, a network connection represented by the second entry of the network attack path network connection table 420 has a network attack path NC table ID of 2 and is contained in and/or associated with a network attack path that corresponds to network attack path table ID 1 of the network attack path table 400 of FIG. 4A. A source resource of this network connection has a source resource ID of 28 and is provided by cloud provider 1. A target resource of this network connection has a target resource ID of 41 and is provided by cloud provider 1. For example, the source resource of this example may be the gateway 106 of FIG. 1A, the target resource of this example may be the router 108 of FIG. 1A, and cloud provider 1 may be the cloud provider 120 of FIG. 1A. The network connection of this example has a label of "RELATED_TO", which indicates that the source resource of the network connection is related to the target resource in a manner indicated by the properties. For example, the properties may include text such as "The Internet gateway uses the route table of the router." to indicate that the source resource is related to the target resource through the route table of the router 108.

By way of example, the attack path identification module 210 and/or, more generally, the relational representation generator 142, may determine that a resource has a security vulnerability. For example, the attack path identification module 210 may determine that the VM 118 of FIG. 1A has a security vulnerability using portion(s) of the cloud provider table 300, the resource table 310, the network connection table 320, the network path table 330, and/or the network path component table 340. In some such embodiments, the attack path identification module 210 may determine that the portion(s) conform(s) to an attack path definition defining the security vulnerability.

The attack path identification module 210 may determine that the VM 118 has a resource ID of 125. The attack path identification module 210 may query the network path table 330 using the resource ID of 125 for one or more network paths containing the VM 118. The attack path identification module 210 may identify one or more network paths, such as a network path having the network path table ID of 1, from the network path table 330. In some embodiments, the attack path identification module 210 may identify the network path having the network path table ID of 1 as an attack path along which the VM 118 may be exploited. In some embodiments, the attack path identification module 210 may generate a relational representation of the network path having the network path table ID of 1 as at least one table represented in the examples of FIGS. 4A-4C.

Figure 5:
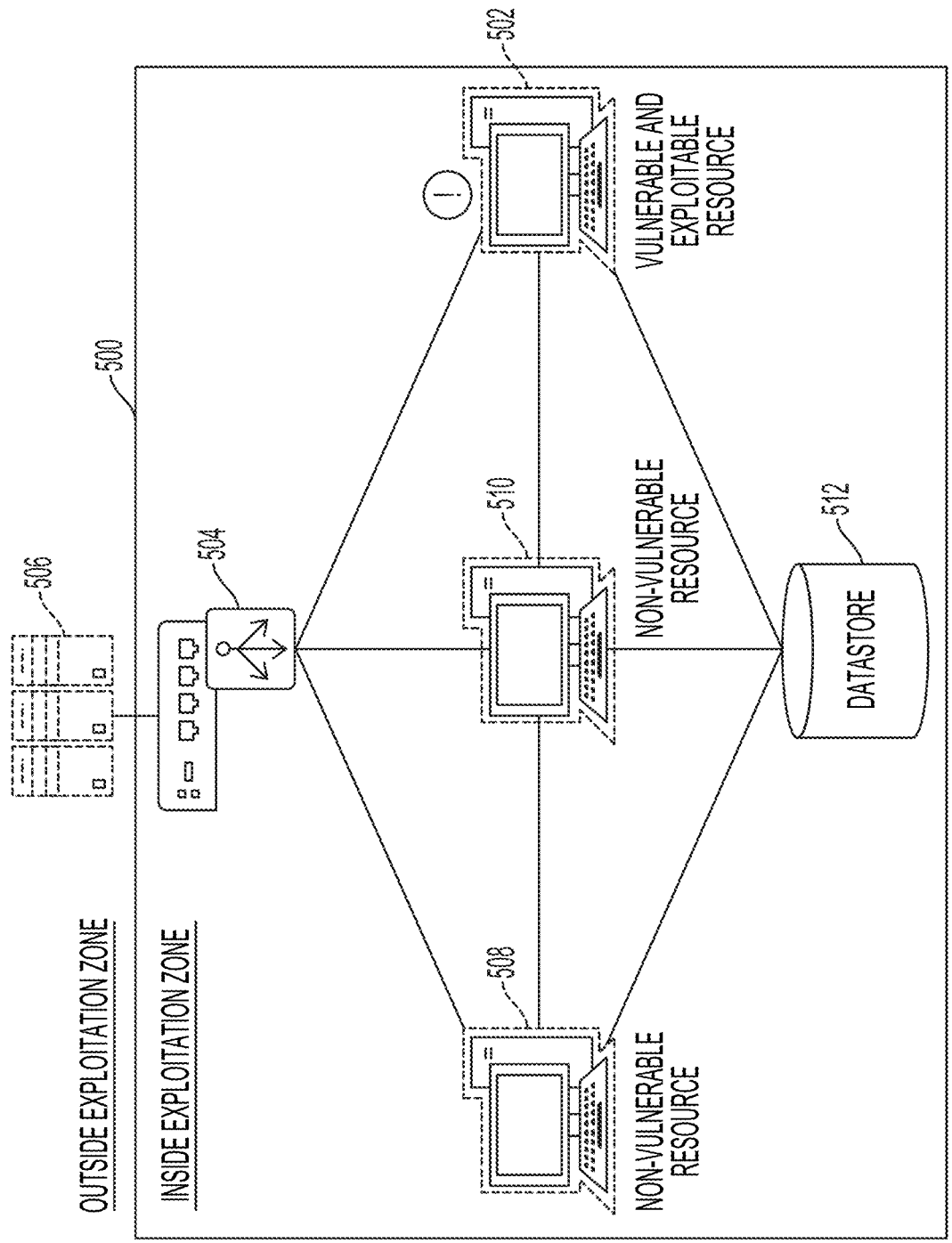
FIG. 5 shows an example implementation of an exploitation zone associated with a vulnerable and exploitable resource, in accordance with some embodiments of the technology described herein.

FIG. 5 shows an example implementation of an exploitation zone 500 associated with a vulnerable and exploitable resource 502. The vulnerable and exploitable resource 502 of this example is a VM. Alternatively, any other resource is contemplated for this example. In some embodiments, FIG. 5 illustrates a visualization (e.g., an exploitation zone visualization) that may implement a GUI including at least one GUI element to represent information about the exploitation zone 500 associated with the vulnerable and exploitable resource 502. For example, portion(s) of the illustration of FIG. 5 may be displayed on a GUI including a visualization including at least one GUI element for presentation of at least the exploitation zone 500 on at least one display device.

The vulnerable and exploitable resource 502 is vulnerable because it has at least one security vulnerability. The vulnerable and exploitable resource 502 is exploitable because it is accessible, such as by being either accessible or partially accessible as described herein. For example, the vulnerable and exploitable resource 502 may be accessible via a load balancer 504, which may be accessible by users and/or malicious actors associated with a physical and/or virtual computing system 506 external to the exploitation zone 500.

The exploitation zone 500 of the illustrated example represents resources that may be exploited at least in part due to the vulnerable and exploitable resource 502. For example, a malicious actor may exploit the vulnerable and exploitable resource 502. In the illustrated example, the vulnerable and exploitable resource 502 has access to other resources 508, 510, 512 including VMs 508, 510 and a datastore 512.

In some embodiments, the attack path analysis software application 200 may identify the exploitation zone 500 by using portion(s) of a relational representation corresponding to the vulnerable and exploitable resource 502. For example, the attack path analysis software application 200 may determine that the resource 502 is a vulnerable and/or exploitable resource. In some such embodiments, the attack path analysis software application 200 may retrieve portion(s) of the relational representation from at least one datastore. The attack path analysis software application 200 may, using the retrieved portion(s), identify other resource(s) to which the vulnerable and exploitable resource 502 has access. In some embodiments, the attack path analysis software application 200 may identify the other resource(s) as resources within the exploitation zone 500 caused by the vulnerable and exploitable resource 502.

Figure 6:
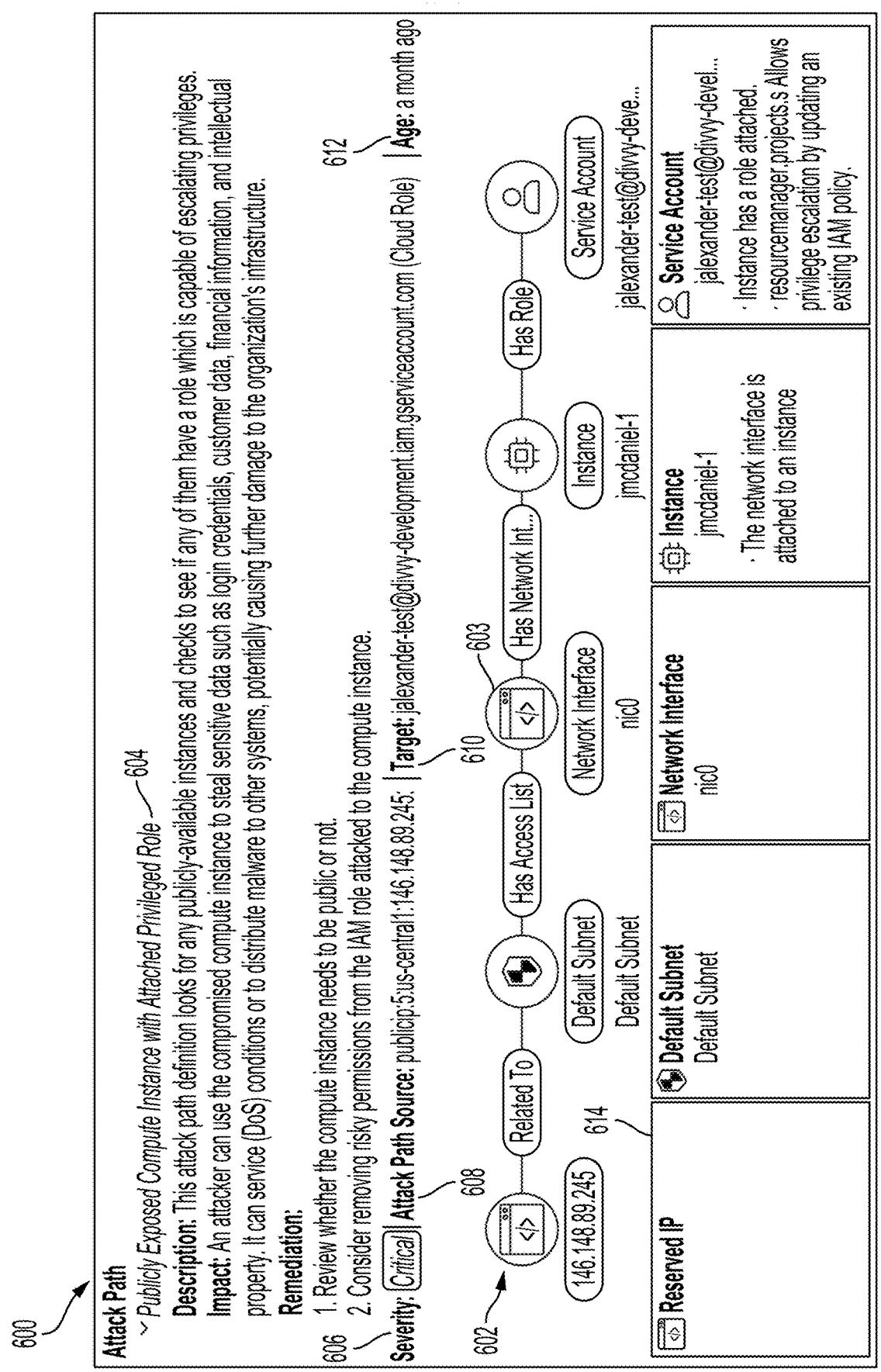
FIG. 6 shows an example implementation of a network attack path visualization, in accordance with some embodiments of the technology described herein.

FIG. 6 shows an example implementation of a network attack path visualization 600. The network attack path visualization 600 of this example is a GUI including at least one GUI element to represent information about an attack path 602. For example, the GUI module 224 may generate the network attack path visualization 600, or portion(s) thereof, for presentation on at least one display device. The attack path 602 of this example includes a plurality of nodes 603 representing resources, such as one(s) of the resources 104, 106, 108, 110, 112, 114, 116, 118 of the computing environment 100 of FIG. 1A.

The network attack path visualization 600 of this example includes at least one GUI element containing information about an attack path definition 604 to which a relational representation of the attack path conforms. For example, the attack path 602 may be identified as an attack path because portion(s) of the network attack path table 400, the network attack path resource table 410, and/or the network attack path network connection table 420 corresponding to the attack path 602 conform to the attack path definition of a publicly exposed compute instance with attached privileged role. The at least one GUI element also includes a description, impact, and remediation measures (e.g., measures that may mitigate and/or resolve the security vulnerability).

The network attack path visualization 600 of this example includes at least one GUI element containing information about a severity 606 of the attack path 602, information about a source resource 608 of the attack path 602, information about a target resource 610 of the attack path 602, and an age 612 of the attack path 602.

The network attack path visualization 600 of this example includes at least one GUI element containing content 614 indicating an explanation for why the attack path 602 is identified as an attack path. For example, the content 614 includes explanatory statement(s) why one or more of the resources of the attack path 602 at least partially contribute to the attack path 602 being identified as an attack path.

In some embodiments, the GUI module 224 of FIG. 2 may generate a GUI including a visualization of an exploitation zone associated with one of the nodes of the attack path 602. For example, the GUI module 224 may receive user input indicating a selection of a node in the attack path 602. In some embodiments, the GUI module 224 may, using the relational representation corresponding to the selected node, may identify one or more other nodes that have a respective network connection to the selected node. For example, the vulnerable and exploitable resource 502 of FIG. 5 may be represented by the selected node, and the GUI module 224 may identify resources 508, 510, 512 as having a network connection to the vulnerable and exploitable resource 502. In some such embodiments, the GUI module 224 may display at least one GUI element containing content that indicates that nodes representing the resources 508, 510, 512 are exploitable based on the nodes representing the resources 508, 510, 512 have a respective network connection to the vulnerable and exploitable resource 502.

Figure 7:
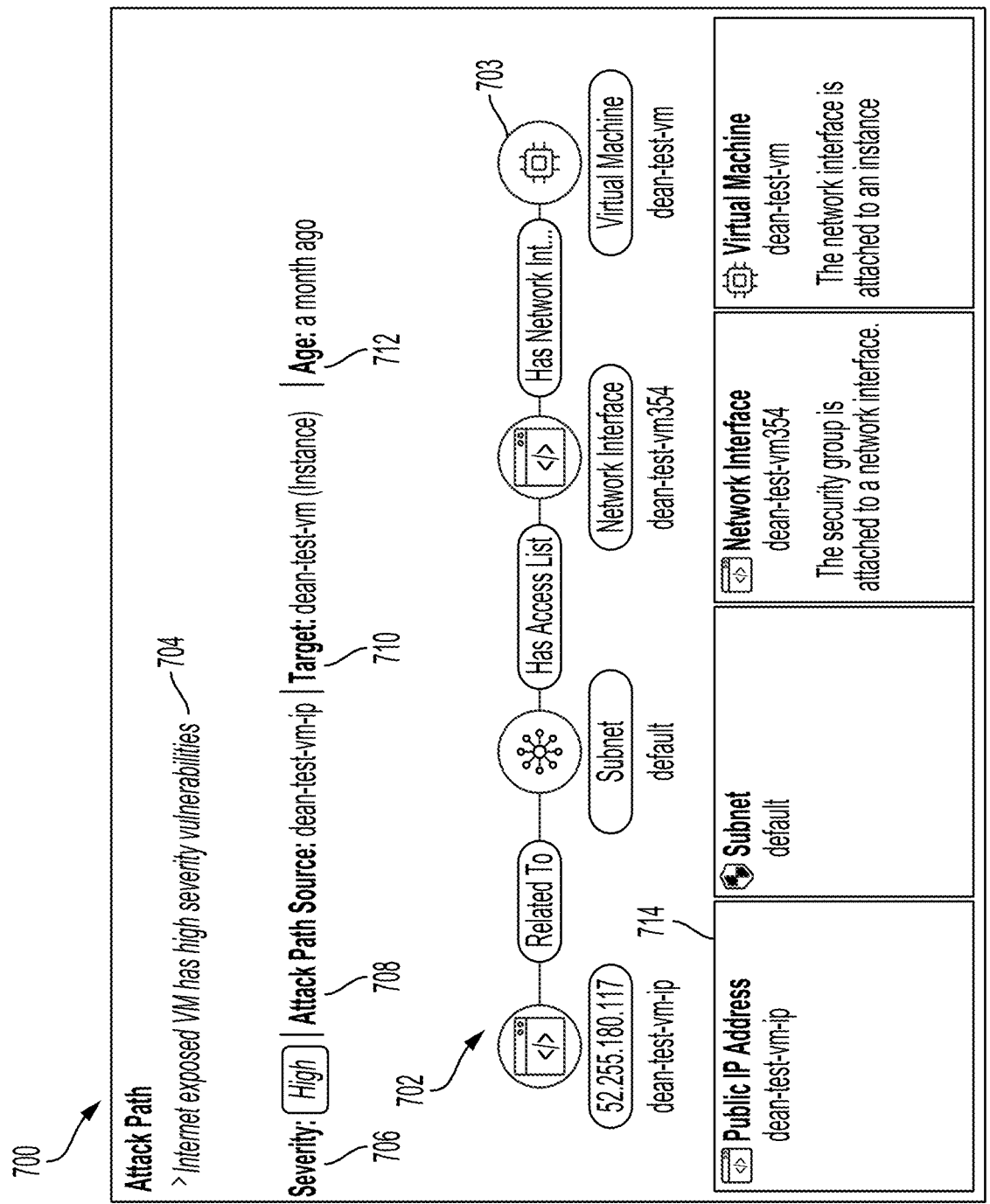
FIG. 7 shows another example implementation of a network attack path visualization, in accordance with some embodiments of the technology described herein.

FIG. 7 shows an example implementation of another network attack path visualization 700. The network attack path visualization 700 of this example is a GUI including at least one GUI element to represent information about another attack path 702. For example, the GUI module 224 may generate the network attack path visualization 600, or portion(s) thereof, for presentation on at least one display device. The attack path 702 of this example includes a plurality of nodes 703 representing resources, such as one(s) of the resources 104, 106, 108, 110, 112, 114, 116, 118 of the computing environment 100 of FIG. 1A.

The network attack path visualization 700 of this example includes at least one GUI element containing information about an attack path definition 704 to which a relational representation of the attack path conforms. For example, the attack path 702 may be identified as an attack path because portion(s) of the network attack path table 400, the network attack path resource table 410, and/or the network attack path network connection table 420 corresponding to the attack path 702 conform to the attack path definition of an Internet exposed VM has high security vulnerabilities.

The network attack path visualization 700 of this example includes at least one GUI element containing information about a severity 706 of the attack path 702, information about a source resource 708 of the attack path 702, information about a target resource 710 of the attack path 702, and an age 712 of the attack path 702.

The network attack path visualization 700 of this example includes at least one GUI element containing content 714 indicating an explanation for why the attack path 702 is identified as an attack path. For example, the content 714 includes explanatory statement(s) why one or more of the resources of the attack path 702 at least partially contribute to the attack path 702 being identified as an attack path.

FIGS. 8-12 are flowcharts representative of example processes to be performed and/or example machine-readable instructions that may be executed by processor circuitry to implement the attack path analysis software application 200 of FIG. 2. Additionally or alternatively, block(s) of one(s) of the flowcharts of FIGS. 8, 9, 10, 11, and/or 12 may be representative of state(s) of one or more hardware-implemented state machines, algorithm(s) that may be implemented by hardware alone such as an ASIC, etc., and/or any combination(s) thereof.

Figure 8:
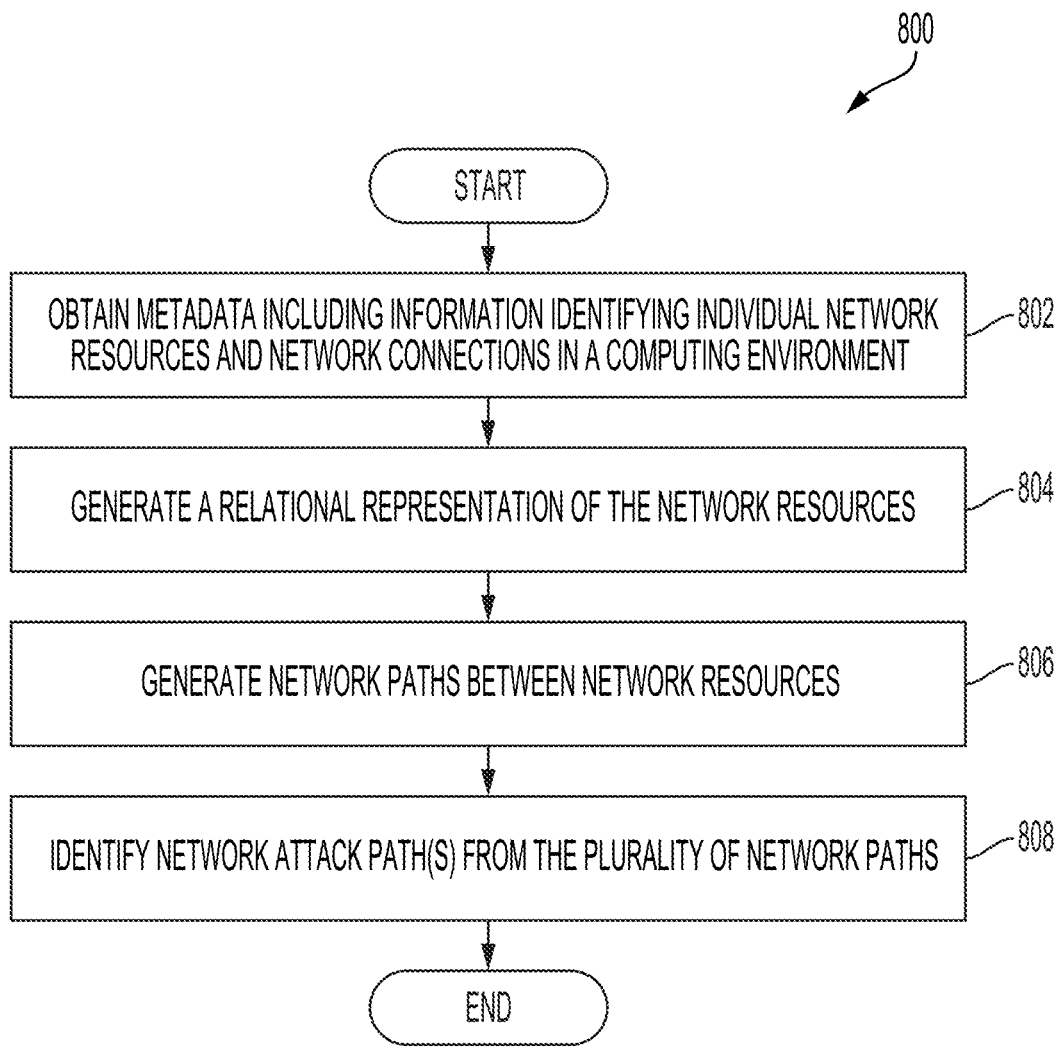
FIG. 8 is a flowchart representative of an example process that may be performed and/or example machine-readable instructions that may be executed by processor circuitry to implement the attack path analysis software application of FIG. 2 to identify network attack path(s), in accordance with some embodiments of the technology described herein.

FIG. 8 is a flowchart 800 representative of an example process that may be performed and/or example machine-readable instructions that may be executed by processor circuitry to implement the attack path analysis software application 200 of FIG. 2 to identify network attack path(s). The flowchart 800 of FIG. 8 begins at block 802, at which the attack path analysis software application 200 may obtain metadata including information identifying individual network resources and network connections in a computing environment. For example, the network interface module 202 of FIG. 2 may obtain metadata from the cloud provider 120 of FIG. 1A indicating a set of network resources in a plurality of network resources and network connections in the set of network resources in the computing environment 100 of FIG. 1A.

At block 804, the attack path analysis software application 200 may generate a relational representation of the network resources. For example, the computing environment evaluation module 204 of FIG. 2 may generate, using the metadata, a relational representation of the set of network resources, the relational representation indicating network resources in the set of network resources and network connections among the network resources in the set of network resources. In some embodiments, the computing environment evaluation module 204 may generate the relational representation as at least one table containing information of the resources 104, 106, 108, 110, 112, 114, 116, 118 of FIG. 1A. In some such embodiments, the computing environment evaluation module 204 may output the at least one table to the datastore interface module 206 of FIG. 2 for storage in the at least one datastore 216 of FIG. 2.

At block 806, the attack path analysis software application 200 may generate network paths between network resources. For example, the network path identification module 208 may generate, using the relational representation, a plurality of network paths between network resources in the set of network resources. In some embodiments, the network path identification module 208 may apply a graph traversal technique on information in the at least one table to generate the network paths 220.

At block 808, the attack path analysis software application 200 may identify network attack path(s) from the plurality of network paths. For example, the attack path identification module 210 may identify, from among the plurality of network paths and using the relational representation and information indicating one or more of the plurality of network resources that have at least one respective security vulnerability, one or more network attack paths that may be used to exploit one or more security vulnerabilities of network resources in the set of network resources. After identifying the network attack path(s) at block 808, the flowchart 800 of FIG. 8 concludes.

Figure 9:
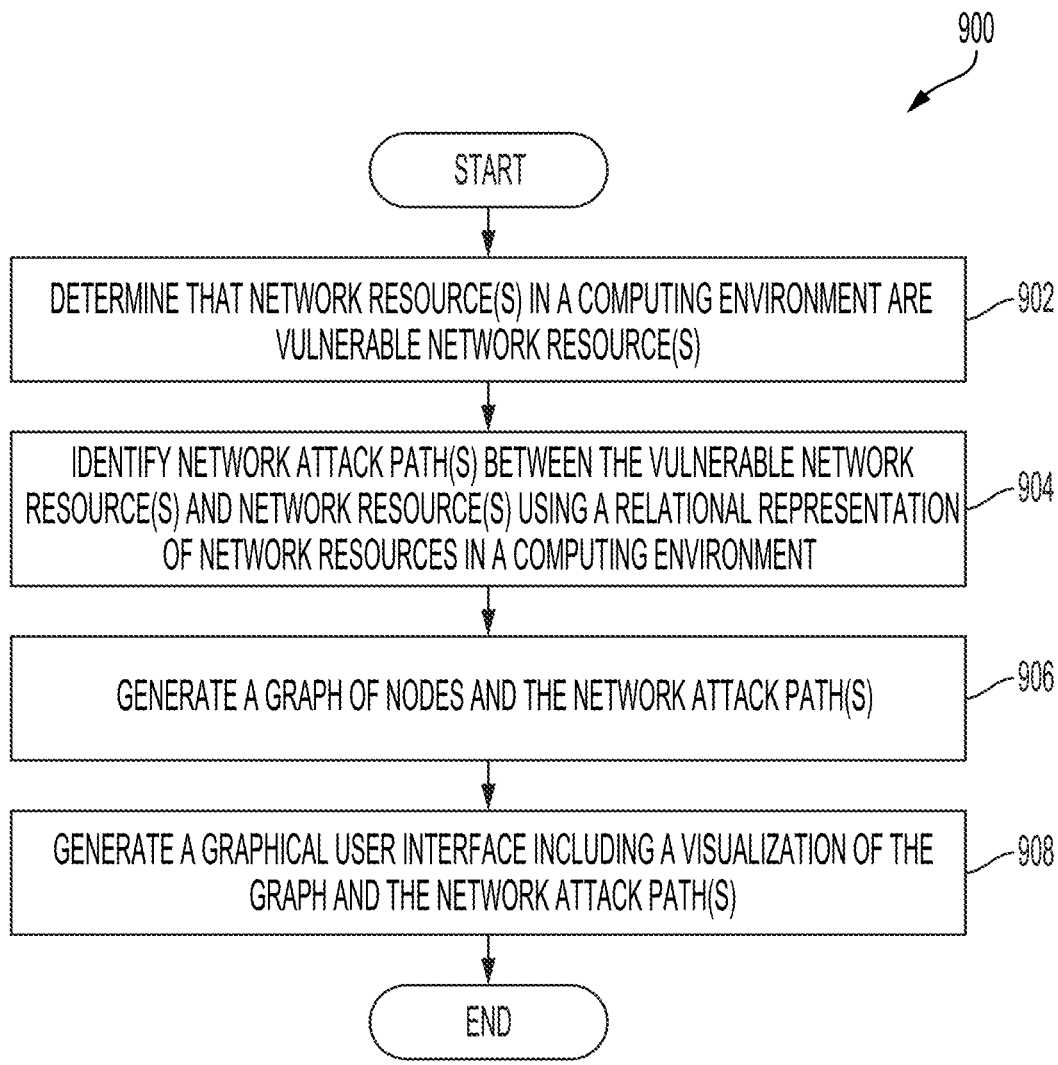
FIG. 9 is a flowchart representative of an example process that may be performed and/or example machine-readable instructions that may be executed by processor circuitry to implement the attack path analysis software application of FIG. 2 to generate a graphical user interface to visualize network attack path(s), in accordance with some embodiments of the technology described herein.

FIG. 9 is a flowchart 900 representative of an example process that may be performed and/or example machine-readable instructions that may be executed by processor circuitry to implement the attack path analysis software application 200 of FIG. 2 to generate a GUI to visualize network attack path(s). The flowchart 900 of FIG. 9 begins at block 902, at which the attack path analysis software application 200 may determine that network resource(s) in a computing environment are vulnerable network resource(s). For example, the attack path identification module 210 of FIG. 2 may identify one or more vulnerable network resources in a plurality of network resources of the computing environment 100 of FIG. 1A, each of the one or more vulnerable network resources having at least one respective security vulnerability. In some such embodiments, the attack path identification module 210 may identify the one or more vulnerable network resources by determining that portion(s) of a relational representation of the one or more vulnerable network resources conform at least in part to an attack path definition defining the at least one respective security vulnerability.

At block 904, the attack path analysis software application 200 may identify network attack path(s) between the vulnerable network resource(s) and network resource(s) using a relational representation of network resources in a computing environment. For example, the attack path identification module 210 may access at least one portion of a relational representation of a set of network resources in the plurality of network resources, the relational representation indicating network resources in the set of network resources and network connections among the network resources in the set of network resources, and the at least one portion of the relational representation corresponding to the one or more vulnerable network resources. In some embodiments, the attack path identification module 210 may identify, using the at least one portion of the relational representation, one or more network attack paths between the one or more vulnerable network resources and network resources in the set of network resources.

At block 906, the attack path analysis software application 200 may generate a graph of nodes and the network attack path(s). For example, the graphical representation generator 132 of FIG. 2 may generate, using the at least one portion of the relational representation, a graph containing nodes and edges, the nodes representing the one or more vulnerable network resources and network resources in the set of network resources along the one or more network attack paths, the edges representing the one or more network attack paths.

At block 908, the attack path analysis software application 200 may generate a graphical user interface including a visualization of the graph and the network attack path(s). For example, the GUI module 224 of FIG. 2 may generate a GUI including a visualization of the graph and information indicating that the one or more attack paths may be used to exploit one or more security vulnerabilities of network resources in the set of network resources. After generating the GUI at block 908, the flowchart 900 of FIG. 9 concludes.

Figure 10:
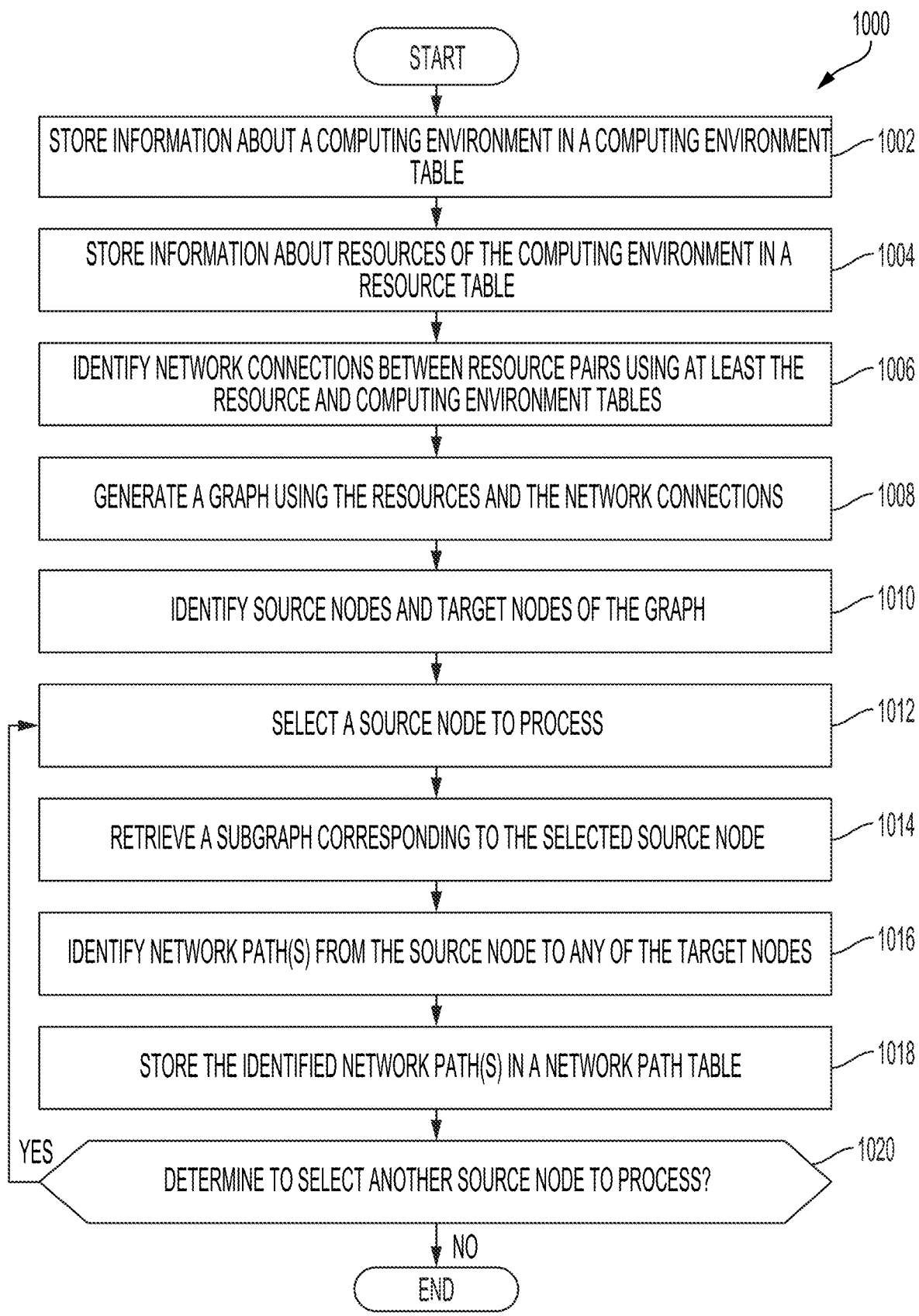
FIG. 10 is a flowchart representative of an example process that may be performed and/or example machine-readable instructions that may be executed by processor circuitry to implement the attack path analysis software application of FIG. 2 to generate relational representation(s) of a computing environment, in accordance with some embodiments of the technology described herein.

FIG. 10 is a flowchart 1000 representative of an example process that may be performed and/or example machine-readable instructions that may be executed by processor circuitry to implement the attack path analysis software application 200 of FIG. 2 to generate relational representation(s) of a computing environment. The flowchart 1000 of FIG. 10 begins at block 1002, at which the attack path analysis software application 200 may store information about a computing environment in a computing environment table. For example, the computing environment evaluation module 204 may obtain the computing environment metadata 212 from the cloud provider 120 via the network interface module 202. In some embodiments, the computing environment evaluation module 204 may generate a computing environment table containing information about the cloud provider 120, and/or, more generally, the computing environment 100. An example implementation of the computing environment table may be the cloud provider table 300 of FIG. 3A.

At block 1004, the attack path analysis software application 200 may store information about resources of the computing environment in a resource table. For example, the computing environment evaluation module 204 may extract information about individual network resources of the computing environment 100. In some embodiments, the computing environment evaluation module 204 may generate the resource table 310 of FIG. 3B using the extracted information.

At block 1006, the attack path analysis software application 200 may identify network connections between resource pairs using at least the resource and computing environment tables. For example, the computing environment evaluation module 204 may identify network connections between pairs of the resources 104, 106, 108, 110, 112, 114, 116, 118 of FIG. 1A using at least one of the cloud provider table 300 or the resource table 310. In some embodiments, the computing environment evaluation module 204 may generate the network connection table 320 of FIG. 3C using information about the identified network connections.

At block 1008, the attack path analysis software application 200 may generate a graph using the resources and the network connections. For example, the graphical representation generator 132 may generate a graph, or portion(s) thereof, using a graph library, such as NetworkX (or any other graph library and/or technique), and information about the resources and the network connections contained in the cloud provider table 300, the resource table 310, and/or the network connection table 320.

At block 1010, the attack path analysis software application 200 may identify source nodes and target nodes of the graph. For example, the graphical representation generator 132 may identify a node representing the gateway 106 of FIG. 1A as a source node and a node representing the datastore 104 of FIG. 1A as a target node in the graphical representation 140 of FIG. 1C.

At block 1012, the attack path analysis software application 200 may select a source node to process. For example, the network path identification module 208 may identify the node representing the gateway 106 to process.

At block 1014, the attack path analysis software application 200 may retrieve a subgraph corresponding to the selected source node. For example, the network path identification module 208 may query, via the datastore interface module 206, the at least one datastore 216 for portion(s) of the cloud provider table 300, the resource table 310, the network connection table 320, the network path table 330, and/or the network path component table network path component table 340 corresponding to the node representing the gateway 106. In some embodiments, the retrieved portion(s) may be used to generate a subgraph, such as a portion of the graphical representation 140. For example, the graphical representation generator 132 may generate a portion of the graphical representation 140 using the retrieved portion(s) rather than generating an entirety of the graphical representation 140.

At block 1016, the attack path analysis software application 200 may identify network path(s) from the source node to any of the target nodes. For example, the network path identification module 208 may perform a graph traversal technique using the node representing the gateway 106 as a starting or initial node. In some embodiments, the network path identification module 208 may identify one or more network paths from the node representing the gateway 106 to other nodes representing other resources of the computing environment 100.

At block 1018, the attack path analysis software application 200 may store the identified network path(s) in a network path table. For example, the network path identification module 208 may store the one or more identified network paths in at least one table in the at least one datastore 216.

At block 1020, the attack path analysis software application 200 may determine to select another source node to process. For example, the network path identification module 208 may determine that there is/are other node(s) to process, such as the node representing the router 108 of FIG. 1A. If, at block 1020, the attack path analysis software application 200 determines to select another source node to process, control returns to block 1012. Otherwise, the flowchart 1000 of FIG. 10 concludes.

Figure 11:
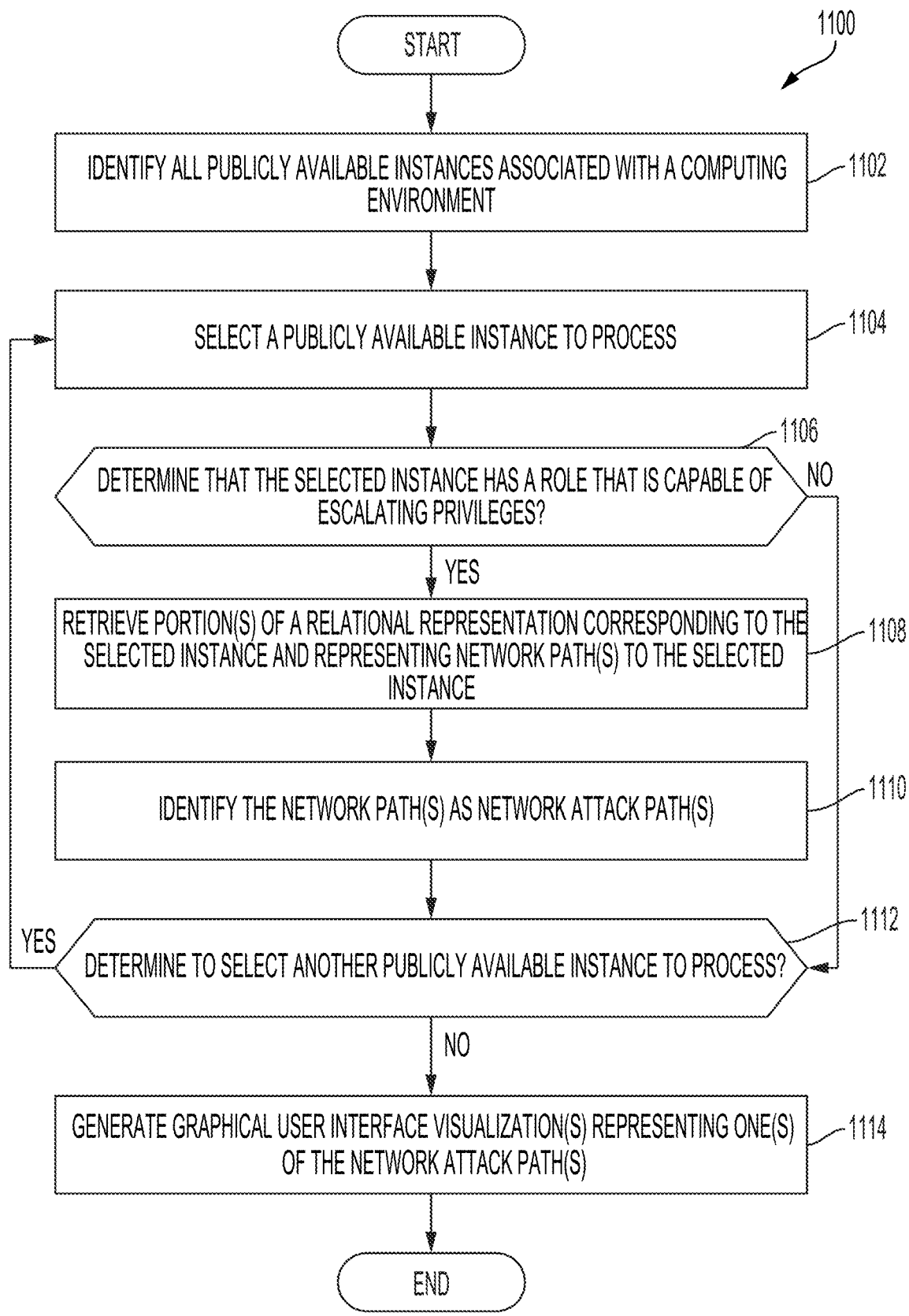
FIG. 11 is a flowchart representative of an example process that may be performed and/or example machine-readable instructions that may be executed by processor circuitry to implement the attack path analysis software application of FIG. 2 to identify a network attack path by evaluating an example attack path definition, in accordance with some embodiments of the technology described herein.

FIG. 11 is a flowchart 1100 representative of an example process that may be performed and/or example machine-readable instructions that may be executed by processor circuitry to implement the attack path analysis software application 200 of FIG. 2 to identify a network attack path by evaluating an example attack path definition. For example, the flowchart 1100 of FIG. 11 may represent and/or implement logic of an attack path definition. The flowchart 1100 of FIG. 11 begins at block 1102, at which the attack path analysis software application 200 may identify all publicly available instances associated with a computing environment. For example, the computing environment evaluation module 204 of FIG. 2 may identify all publicly available resources of the computing environment 100 of FIG. 1A by using the computing environment metadata 212.

At block 1104, the attack path analysis software application 200 selects a publicly available instance to process. For example, the attack path identification module 210 of FIG. 2 may select one of the publicly available instances such as the VM 118 of FIG. 1A to process.

At block 1106, the attack path analysis software application 200 determines whether the selected instance has a role that is capable of escalating privileges. For example, the attack path identification module 210 may determine, using information about the VM 118 in the at least one datastore 216, that the VM 118 has a role that is capable of escalating privileges.

If, at block 1106, the attack path analysis software application 200 determines that the selected instance does not have a role that is capable of escalating privileges, control proceeds to block 1112. Otherwise, control proceeds to block 1108.

At block 1108, the attack path analysis software application 200 retrieves portion(s) of a relational representation corresponding to the selected instance and representing network path(s) to the selected instance. For example, the attack path identification module 210 may query, via the datastore interface module 206, the at least one datastore 216 for portion(s) of the network path table 330 corresponding to the VM 118. For example, the attack path identification module 210 may query the at least one datastore 216 for one or more network paths containing the VM 118.

At block 1110, the attack path analysis software application 200 identifies the network path(s) as network attack path(s). For example, the attack path identification module 210 may identify the one or more network paths containing the VM 118 as one or more network attack paths.

At block 1112, the attack path analysis software application 200 determines whether to select another publicly available instance to process. For example, the attack path identification module 210 may select another one of the publicly available instances such as the VM 116 of FIG. 1A to process.

If, at block 1112, the attack path analysis software application 200 determines to select another publicly available instance to process, control returns to block 1104. Otherwise, control proceeds to block 1114.

At block 1114, the attack path analysis software application 200 generates graphical user interface visualization(s) representing one(s) of the network attack path(s). For example, the GUI module 224 of FIG. 2 may generate, using the one or more network attack paths, a GUI containing at least one visualization containing the one or more network attack paths and/or information about the one or more network attack paths for display on at least one display device. After generating the graphical user interface visualization(s) at block 1114, the flowchart 1100 of FIG. 11 concludes.

Figure 12:
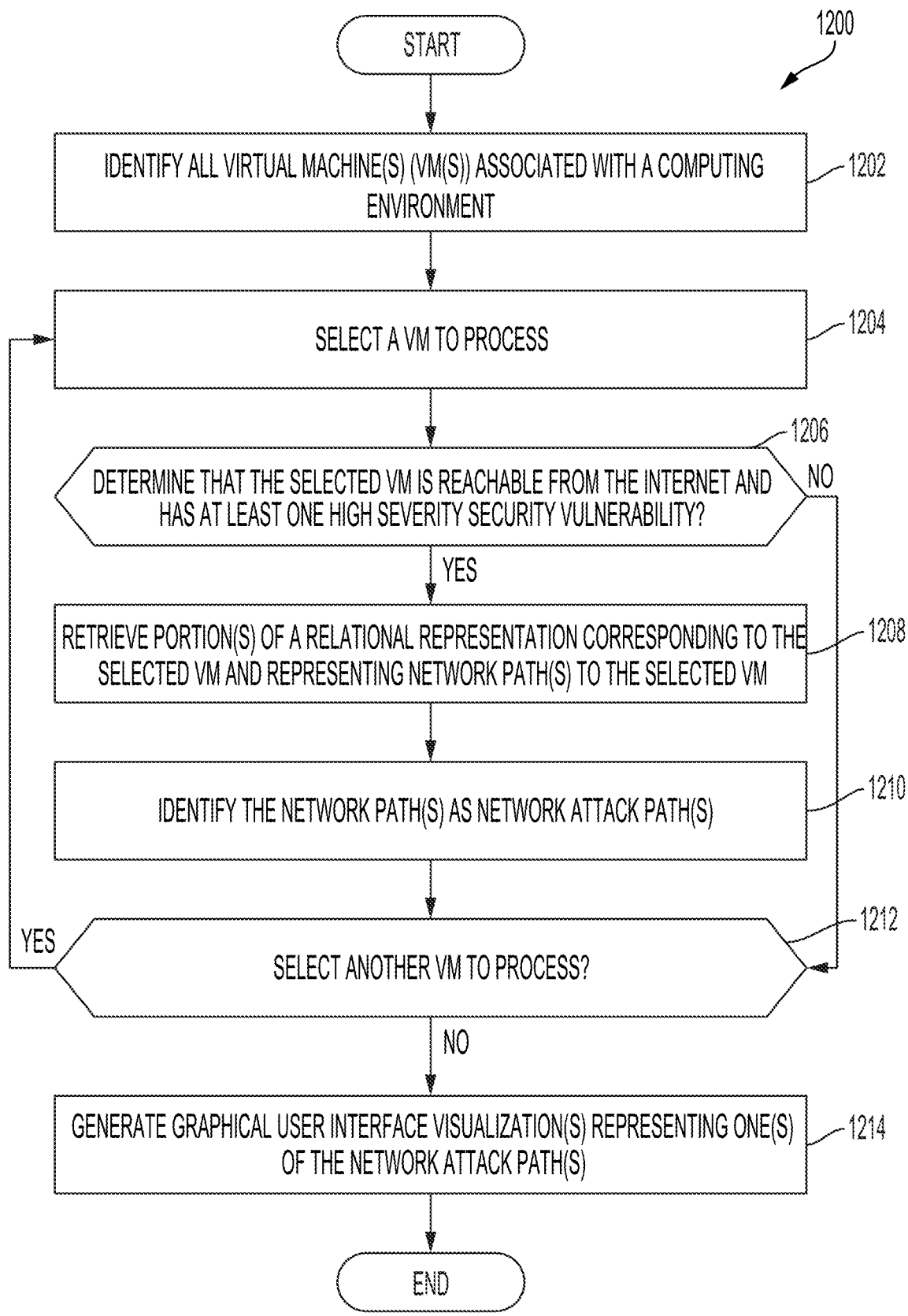
FIG. 12 is a flowchart representative of an example process that may be performed and/or example machine-readable instructions that may be executed by processor circuitry to implement the attack path analysis software application of FIG. 2 to identify a network attack path by evaluating another example attack path definition, in accordance with some embodiments of the technology described herein.

FIG. 12 is a flowchart 1200 representative of an example process that may be performed and/or example machine-readable instructions that may be executed by processor circuitry to implement the attack path analysis software application 200 of FIG. 2 to identify a network attack path by evaluating another example attack path definition. For example, the flowchart 1200 of FIG. 12 may represent and/or implement logic of an attack path definition. The flowchart 1200 of FIG. 12 begins at block 1202, at which the attack path analysis software application 200 may identify all virtual machine(s) (VM(s)) associated with a computing environment. For example, the computing environment evaluation module 204 of FIG. 2 may identify the VMs 116, 118 of the computing environment 100 of FIG. 1A.

At block 1204, the attack path analysis software application 200 selects a VM to process. For example, the attack path identification module 210 of FIG. 2 may select the VM 118 of FIG. 1A to process.

At block 1206, the attack path analysis software application 200 determines whether the selected VM is reachable from the Internet and has at least one high severity security vulnerability. For example, the attack path identification module 210 may determine that the VM 118 has at least one high severity security vulnerability, such as having outdated software, a known misconfiguration, etc. In some embodiments, the attack path identification module 210 may determine that the VM 118 is reachable by a user and/or entity via the at least one network 126 of FIG. 1A.

At block 1208, the attack path analysis software application 200 retrieves portion(s) of a relational representation corresponding to the selected VM and representing network path(s) to the selected VM. For example, the attack path identification module 210 may query, via the datastore interface module 206, the at least one datastore 216 for portion(s) of the network path table 330 corresponding to the VM 118. For example, the attack path identification module 210 may query the at least one datastore 216 for one or more network paths containing the VM 118.

At block 1210, the attack path analysis software application 200 identifies the network path(s) as network attack path(s). For example, the attack path identification module 210 may identify the one or more network paths containing the VM 118 as one or more network attack paths.

At block 1212, the attack path analysis software application 200 determines whether to select another VM to process. For example, the attack path identification module 210 may determine to select the VM 116 of FIG. 1A to process.

If, at block 1212, the attack path analysis software application 200 determines to select another VM to process, control returns to block 1204. Otherwise, control proceeds to block 1214.

At block 1214, the attack path analysis software application 200 generates graphical user interface visualization(s) representing one(s) of the network attack path(s). For example, the GUI module 224 of FIG. 2 may generate, using the one or more network attack paths, a GUI containing at least one visualization containing the one or more network attack paths and/or information about the one or more network attack paths for display on at least one display device. After generating the graphical user interface visualization(s) at block 1214, the flowchart 1200 of FIG. 12 concludes.

FIG. 13 is an example implementation of an electronic platform 1300 structured to execute the machine-readable instructions of FIGS. 8, 9, 10, 11, and/or 12 to implement the attack path analysis software application 200 of FIG. 2. For example, the electronic platform 1300 may implement a network attack path identification system. It should be appreciated that FIG. 13 is intended neither to be a description of necessary components for an electronic and/or computing device to operate the attack path analysis software application 200, in accordance with the techniques described herein, nor a comprehensive depiction. The electronic platform 1300 of this example may be an electronic device, such as a cellular network device, a desktop computer, a laptop computer, a tablet computer, a server (e.g., a computer server, a blade server, a rack-mounted server), a workstation, or any other type of computing and/or electronic device.

The electronic platform 1300 of the illustrated example includes processor circuitry 1302, which may be implemented by one or more programmable processors, one or more hardware-implemented state machines, one or more ASICs, etc., and/or any combination(s) thereof. For example, the one or more programmable processors may include one or more CPUs, one or more DSPs, one or more FPGAs, one or more GPUs, etc., and/or any combination(s) thereof. The processor circuitry 1302 includes processor memory 1304, which may be volatile memory, such as random-access memory (RAM) of any type. The processor circuitry 1302 of this example implements the computing environment evaluation module 204, the network path identification module 208, the attack path identification module 210, the graphical representation generator 132, and the GUI module 224 of FIG. 2.

The processor circuitry 1302 may execute machine-readable instructions 1306 (identified by INSTRUCTIONS), which are stored in the processor memory 1304, to implement at least one of the computing environment evaluation module 204, the network path identification module 208, the attack path identification module 210, the graphical representation generator 132, or the GUI module 224. The machine-readable instructions 1306 may include data representative of computer-executable and/or machine-executable instructions implementing techniques that operate according to the techniques described herein. For example, the machine-readable instructions 1306 may include data (e.g., code, embedded software (e.g., firmware), software, etc.) representative of the flowcharts of FIGS. 8, 9, 10, 11, and/or 12, or portion(s) thereof.

The electronic platform 1300 includes memory 1308, which may include the instructions 1306. The memory 1308 of this example may be controlled by a memory controller 1310. For example, the memory controller 1310 may control reads, writes, and/or, more generally, access(es) to the memory 1308 by other component(s) of the electronic platform 1300. The memory 1308 of this example may be implemented by volatile memory, non-volatile memory, etc., and/or any combination(s) thereof. For example, the volatile memory may include static random-access memory (SRAM), dynamic random-access memory (DRAM), cache memory (e.g., Level 1 (L1) cache memory, Level 2 (L2) cache memory, Level 3 (L3) cache memory, etc.), etc., and/or any combination(s) thereof. In some examples, the non-volatile memory may include Flash memory, electrically erasable programmable read-only memory (EEPROM), magnetoresistive random-access memory (MRAM), ferroelectric random-access memory (FeRAM, F-RAM, or FRAM), etc., and/or any combination(s) thereof.

The electronic platform 1300 includes input device(s) 1312 to enable data and/or commands to be entered into the processor circuitry 1302. For example, the input device(s) 1312 may include an audio sensor, a camera (e.g., a still camera, a video camera, etc.), a keyboard, a microphone, a mouse, a touchscreen, a voice recognition system, etc., and/or any combination(s) thereof.

The electronic platform 1300 includes output device(s) 1314 to convey, display, and/or present information to a user (e.g., a human user, a machine user, etc.). For example, the output device(s) 1314 may include one or more display devices, speakers, etc. The one or more display devices may include an augmented reality (AR) and/or virtual reality (VR) display, a liquid crystal display (LCD), a light-emitting diode (LED) display, an organic light-emitting diode (OLED) display, a quantum dot (QLED) display, a thin-film transistor (TFT) LCD, a touchscreen, etc., and/or any combination(s) thereof. The output device(s) 1314 can be used, among other things, to generate, launch, and/or present a user interface (e.g., a GUI containing at least one GUI element). For example, the user interface may be generated and/or implemented by the output device(s) 1314 for visual presentation of output and speakers or other sound generating devices for audible presentation of output.

The electronic platform 1300 includes accelerators 1316, which are hardware devices to which the processor circuitry 1302 may offload compute tasks to accelerate their processing. For example, the accelerators 1316 may include artificial intelligence/machine-learning (AI/ML) processors, ASICs, FPGAs, graphics processing units (GPUs), neural network (NN) processors, systems-on-chip (SoCs), vision processing units (VPUs), etc., and/or any combination(s) thereof. In some examples, one or more of the computing environment evaluation module 204, the network path identification module 208, the attack path identification module 210, the graphical representation generator 132, and/or the GUI module 224 may be implemented by one(s) of the accelerators 1316 instead of the processor circuitry 1302. In some examples, the computing environment evaluation module 204, the network path identification module 208, the attack path identification module 210, the graphical representation generator 132, and/or the GUI module 224 may be executed concurrently (e.g., in parallel, substantially in parallel, etc.) by the processor circuitry 1302 and the accelerators 1316. For example, the processor circuitry 1302 and one(s) of the accelerators 1316 may execute in parallel function(s) corresponding to the attack path identification module 210.

The electronic platform 1300 includes storage 1318 to record and/or control access to data, such as the machine-readable instructions 1306. In this example, the storage 1318 may implement the at least one datastore 216. The storage 1318 may be implemented by one or more mass storage disks or devices, such as HDDs, SSDs, etc., and/or any combination(s) thereof. The at least one datastore 216 of this example includes one or more tables 1319. For example, the one or more tables 1319 may implement any one(s) of the tables 300, 310, 320, 330, 340, 400, 410, 420 described herein. In the illustrated example, the at least one datastore 216 and the table(s) 1319 are also shown separately from the electronic platform 1300. For example, the at least one datastore 216 and the table(s) 1319 may be implemented only by the electronic platform 1300, implemented only separately from the electronic platform 1300, or implemented by the electronic platform 1300 and separately from the electronic platform 1300.

The electronic platform 1300 includes interface(s) 1320 to effectuate exchange of data with external devices (e.g., computing and/or electronic devices of any kind) via a network 1322. In this example, the interface(s) 1320 may implement the network interface module 202 and the datastore interface module 206 of FIG. 2. The interface(s) 1320 of the illustrated example may be implemented by an interface device, such as network interface circuitry (e.g., a NIC, a smart NIC, etc.), a gateway, a router, a switch, etc., and/or any combination(s) thereof. The interface(s) 1320 may implement any type of communication interface, such as BLUETOOTH®, a cellular telephone system (e.g., a 4G LTE interface, a 5G interface, a future generation 6G interface, etc.), an Ethernet interface, a near-field communication (NFC) interface, an optical disc interface (e.g., a Blu-ray disc drive, a Compact Disk (CD) drive, a Digital Versatile Disk (DVD) drive, etc.), an optical fiber interface, a satellite interface (e.g., a BLOS satellite interface, a LOS satellite interface, etc.), a Universal Serial Bus (USB) interface (e.g., USB Type-A, USB Type-B, USB TYPE-C™ or USB-C™, etc.), etc., and/or any combination(s) thereof.

The electronic platform 1300 includes a power supply 1324 to store energy and provide power to components of the electronic platform 1300. The power supply 1324 may be implemented by a power converter, such as an alternating current-to-direct-current (AC/DC) power converter, a direct current-to-direct current (DC/DC) power converter, etc., and/or any combination(s) thereof. For example, the power supply 1324 may be powered by an external power source, such as an alternating current (AC) power source (e.g., an electrical grid), a direct current (DC) power source (e.g., a battery, a battery backup system, etc.), etc., and the power supply 1324 may convert the AC input or the DC input into a suitable voltage for use by the electronic platform 1300. In some examples, the power supply 1324 may be a limited duration power source, such as a battery (e.g., a rechargeable battery such as a lithium-ion battery).

Component(s) of the electronic platform 1300 may be in communication with one(s) of each other via a bus 1326. For example, the bus 1326 may be any type of computing and/or electrical bus, such as an I2C bus, a PCI bus, a PCIe bus, a SPI bus, and/or the like.

The network 1322 may be implemented by any wired and/or wireless network(s) such as one or more cellular networks (e.g., 4G LTE cellular networks, 5G cellular networks, future generation 6G cellular networks, etc.), one or more data buses, one or more local area networks (LANs), one or more optical fiber networks, one or more private networks, one or more public networks, one or more wireless local area networks (WLANs), etc., and/or any combination(s) thereof. For example, the network 1322 may be the Internet, but any other type of private and/or public network is contemplated.

The network 1322 of the illustrated example facilitates communication between the interface(s) 1320 and a central facility 1328. The central facility 1328 in this example may be an entity associated with one or more servers, such as one or more physical hardware servers and/or virtualizations of the one or more physical hardware servers. For example, the central facility 1328 may be implemented by a public cloud provider, a private cloud provider, etc., and/or any combination(s) thereof. In this example, the central facility 1328 may compile, generate, update, etc., the machine-readable instructions 1306 and store the machine-readable instructions 1306 for access (e.g., download) via the network 1322. For example, the electronic platform 1300 may transmit a request, via the interface(s) 1320, to the central facility 1328 for the machine-readable instructions 1306 and receive the machine-readable instructions 1306 from the central facility 1328 via the network 1322 in response to the request.

Additionally or alternatively, the interface(s) 1320 may receive the machine-readable instructions 1306 via non-transitory machine-readable storage media, such as an optical disc 1330 (e.g., a Blu-ray disc, a CD, a DVD, etc.) or any other type of removable non-transitory machine-readable storage media such as a USB drive 1332. For example, the optical disc 1330 and/or the USB drive 1332 may store the machine-readable instructions 1306 thereon and provide the machine-readable instructions 1306 to the electronic platform 1300 via the interface(s) 1320.

Techniques operating according to the principles described herein may be implemented in any suitable manner. The processing and decision blocks of the flowcharts above represent steps and acts that may be included in algorithms that carry out these various processes. Algorithms derived from these processes may be implemented as software integrated with and directing the operation of one or more single- or multi-purpose processors, may be implemented as functionally equivalent circuits such as a DSP circuit or an ASIC, or may be implemented in any other suitable manner. It should be appreciated that the flowcharts included herein do not depict the syntax or operation of any particular circuit or of any particular programming language or type of programming language. Rather, the flowcharts illustrate the functional information one skilled in the art may use to fabricate circuits or to implement computer software algorithms to perform the processing of a particular apparatus carrying out the types of techniques described herein. For example, the flowcharts, or portion(s) thereof, may be implemented by hardware alone (e.g., one or more analog or digital circuits, one or more hardware-implemented state machines, etc., and/or any combination(s) thereof) that is configured or structured to carry out the various processes of the flowcharts. In some examples, the flowcharts, or portion(s) thereof, may be implemented by machine-executable instructions (e.g., machine-readable instructions, computer-readable instructions, computer-executable instructions, etc.) that, when executed by one or more single- or multi-purpose processors, carry out the various processes of the flowcharts. It should also be appreciated that, unless otherwise indicated herein, the particular sequence of steps and/or acts described in each flowchart is merely illustrative of the algorithms that may be implemented and can be varied in implementations and embodiments of the principles described herein.

Accordingly, in some embodiments, the techniques described herein may be embodied in machine-executable instructions implemented as software, including as application software, system software, firmware, middleware, embedded code, or any other suitable type of computer code. Such machine-executable instructions may be generated, written, etc., using any of a number of suitable programming languages and/or programming or scripting tools, and also may be compiled as executable machine language code or intermediate code that is executed on a framework, virtual machine, or container.

When techniques described herein are embodied as machine-executable instructions, these machine-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc., that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement using the exemplary techniques described herein, and that embodiments are not limited to being implemented in any specific number, division, or type of functional facilities. In some implementations, all functionalities may be implemented in a single functional facility. It should also be appreciated that, in some implementations, some of the functional facilities described herein may be implemented together with or separately from others (e.g., as a single unit or separate units), or some of these functional facilities may not be implemented.

Machine-executable instructions implementing the techniques described herein (when implemented as one or more functional facilities or in any other manner) may, in some embodiments, be encoded on one or more computer-readable media, machine-readable media, etc., to provide functionality to the media. Computer-readable media include magnetic media such as a hard disk drive, optical media such as a CD or a DVD, a persistent or non-persistent solid-state memory (e.g., Flash memory, Magnetic RAM, etc.), or any other suitable storage media. Such a computer-readable medium may be implemented in any suitable manner. As used herein, the terms "computer-readable media" (also called "computer-readable storage media") and "machine-readable media" (also called "machine-readable storage media") refer to tangible storage media. Tangible storage media are non-transitory and have at least one physical, structural component. In a "computer-readable medium" and "machine-readable medium" as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium, a machine-readable medium, etc., may be altered during a recording process.

Further, some techniques described above comprise acts of storing information (e.g., data and/or instructions) in certain ways for use by these techniques. In some implementations of these techniques—such as implementations where the techniques are implemented as machine-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as machine-executable instructions, these instructions may be executed on one or more suitable computing device(s) and/or electronic device(s) operating in any suitable computer and/or electronic system, or one or more computing devices (or one or more processors of one or more computing devices) and/or one or more electronic devices (or one or more processors of one or more electronic devices) may be programmed to execute the machine-executable instructions. A computing device, electronic device, or processor (e.g., processor circuitry) may be programmed to execute instructions when the instructions are stored in a manner accessible to the computing device, electronic device, or processor, such as in a data store (e.g., an on-chip cache or instruction register, a computer-readable storage medium and/or a machine-readable storage medium accessible via a bus, a computer-readable storage medium and/or a machine-readable storage medium accessible via one or more networks and accessible by the device/processor, etc.). Functional facilities comprising these machine-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more FPGAs for carrying out the techniques described herein, or any other suitable system.

Embodiments have been described where the techniques are implemented in circuitry and/or machine-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The phrase "and/or," as used herein in the specification and in the claims, should be understood to mean "either or both," of the elements so conjoined, e.g., elements that are conjunctively present in some cases and disjunctively present in other cases. Multiple elements listed with "and/or" should be construed in the same fashion, e.g., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The indefinite articles "a" and "an," as used herein in the specification and in the claims, unless clearly indicated to the contrary, should be understood to mean "at least one."

As used herein in the specification and in the claims, the phrase, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

All definitions, as defined and used herein, should be understood to control over dictionary definitions, definitions in documents incorporated by reference, and/or ordinary meanings of the defined terms.

The word "exemplary" is used herein to mean serving as an example, instance, or illustration. Any embodiment, implementation, process, feature, etc., described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

Various aspects are described in this disclosure, which include, but are not limited to, the following aspects:

1. A method for identifying exploitable security vulnerabilities in a computing environment, the computing environment comprising a plurality of network resources and network connections therebetween, the method comprising: using at least one computer hardware processor to perform: obtaining metadata indicating a set of network resources in the plurality of network resources and network connections among network resources in the set of network resources; generating, using the metadata, a relational representation of the set of network resources, the relational representation indicating network resources in the set of network resources and network connections among the network resources in the set of network resources; generating, using the relational representation, a plurality of network paths between network resources in the set of network resources; and identifying, from among the plurality of network paths and using the relational representation and information indicating one or more of the plurality of network resources that have at least one respective security vulnerability, one or more network attack paths that may be used to exploit one or more security vulnerabilities of network resources in the set of network resources.

2. The method of aspect 1, wherein generating the relational representation of the set of network resources using the metadata comprises generating at least one table using the metadata.

3. The method of any of aspects 1-2, wherein the metadata contains information indicating values of attributes of individual network resources in the set of network resources, information indicating values of attributes of the network connections among the network resources in the set of network resources, and information indicating values of attributes of the plurality of network paths, and wherein generating the at least one table using the metadata comprises: generating a first table using the information indicating the values of attributes of the individual network resources in the set of network resources; generating a second table using the information indicating the values of attributes of the network connections among the network resources in the set of network resources; generating a third table using the information indicating the values of attributes of the plurality of network paths; and storing the first, second, and third table in at least one datastore.

4. The method of any of aspects 1-3, further comprising storing the relational representation in at least one datastore.

5. The method of any of aspects 1-4, further comprising: after identifying the one or more network attack paths, generating a table storing information specifying the one or more network attack paths; and storing the table in at least one datastore.

6. The method of any of aspects 1-5 further comprising: generating a risk score for each of the one or more network attack paths, the risk score representing a degree to which a network attack path may be used to exploit the one or more security vulnerabilities of the network resources in the set of network resources; storing the risk score for each of the one or more network attack paths in at least one table; and outputting a ranking of the one or more network attack paths based on their respective risk scores.

7. The method of any of aspects 1-6, wherein generating the plurality of network paths comprises applying a graph traversal technique to data stored in the relational representation.

8. The method of any of aspects 1-7, wherein applying the graph traversal technique comprises performing a breadth first search, a depth first search, or a combination of breadth first search and depth first search.

9. The method of any of aspects 1-8, wherein a first network path of the plurality of network paths comprises a first network resource in the set of network resources, the one or more security vulnerabilities comprise a first security vulnerability, the method further comprising: determining that at least one portion of the relational representation corresponding to the first network resource conforms to a network attack path definition defining the first security vulnerability; and identifying the first network resource to have the first security vulnerability based on the at least one portion of the relational representation conforming to the network attack path definition.

10. The method of any of aspects 1-9, further comprising: determining that a network resource in the plurality of network resources is a vulnerable network resource based on the network resource having at least one security vulnerability; determining that one or more network resources in the set of network resources have a respective network connection to the vulnerable network resource; and identifying the one or more network resources as exploitable network resources based on the one or more network resources having the respective network connection to the vulnerable network resource.

11. A network attack path identification system comprising: at least one non-transitory computer readable storage medium storing instructions; and at least one computer hardware processor to execute the instructions to perform a method for identifying exploitable security vulnerabilities in a computing environment, the computing environment comprising a plurality of network resources and network connections therebetween, the method comprising: obtaining metadata indicating a set of network resources in the plurality of network resources and network connections among network resources in the set of network resources; generating, using the metadata, a relational representation of the set of network resources, the relational representation indicating network resources in the set of network resources and network connections among the network resources in the set of network resources; generating, using the relational representation, a plurality of network paths between network resources in the set of network resources; and identifying, from among the plurality of network paths and using the relational representation and information indicating one or more of the plurality of network resources that have at least one respective security vulnerability, one or more network attack paths that may be used to exploit one or more security vulnerabilities of network resources in the set of network resources.

12. The network attack path identification system of aspect 11, wherein the metadata contains information indicating values of attributes of individual network resources in the set of network resources, information indicating values of attributes of the network connections among the network resources in the set of network resources, and information indicating values of attributes of the plurality of network paths, the at least one computer hardware processor is to: generate a first table using the information indicating the values of attributes of the individual network resources in the set of network resources; generate a second table using the information indicating the values of attributes of the network connections among the network resources in the set of network resources; generate a third table using the information indicating the values of attributes of the plurality of network paths; and store the first, second, and third table in at least one datastore.

13. The network attack path identification system of any of aspects 11-12, wherein the at least one computer hardware processor is to: after identifying the one or more network attack paths, generate a table storing information specifying the one or more network attack paths; and cause storage of the table in at least one datastore.

14. The network attack path identification system of any of aspects 11-13, wherein the at least one computer hardware processor is to: generate a risk score for each of the one or more network attack paths, the risk score representing a degree to which a network attack path may be used to exploit the one or more security vulnerabilities of the network resources in the set of network resources; cause storage of the risk score for each of the one or more network attack paths in at least one table; and output a ranking of the one or more network attack paths based on their respective risk scores.

15. The network attack path identification system of any of aspects 11-14, wherein a first network path of the plurality of network paths comprises a first network resource in the set of network resources, the one or more security vulnerabilities comprise a first security vulnerability, the at least one computer hardware processor is to: determine that at least one portion of the relational representation corresponding to the first network resource conforms to a network attack path definition defining the first security vulnerability; and identify the first network resource to have the first security vulnerability based on the at least one portion of the relational representation conforming to the network attack path definition.

16. At least one non-transitory computer readable storage medium comprising instructions that, when executed by at least one computer hardware processor, causes the at least one computer hardware processor to perform a method for identifying exploitable security vulnerabilities in a computing environment, the computing environment comprising a plurality of network resources and network connections therebetween, the method comprising: obtaining metadata indicating a set of network resources in the plurality of network resources and network connections among network resources in the set of network resources; generating, using the metadata, a relational representation of the set of network resources, the relational representation indicating network resources in the set of network resources and network connections among the network resources in the set of network resources; generating, using the relational representation, a plurality of network paths between network resources in the set of network resources; and identifying, from among the plurality of network paths and using the relational representation and information indicating one or more of the plurality of network resources that have at least one respective security vulnerability, one or more network attack paths that may be used to exploit one or more security vulnerabilities of network resources in the set of network resources.

17. The at least one non-transitory computer readable storage medium of aspect 16, wherein the metadata contains information indicating values of attributes of individual network resources in the set of network resources, information indicating values of attributes of the network connections among the network resources in the set of network resources, and information indicating values of attributes of the plurality of network paths, the instructions to cause the at least one computer hardware processor to: generate a first table using the information indicating the values of attributes of the individual network resources in the set of network resources; generate a second table using the information indicating the values of attributes of the network connections among the network resources in the set of network resources; generate a third table using the information indicating the values of attributes of the plurality of network paths; and store the first, second, and third table in at least one datastore.

18. The at least one non-transitory computer readable storage medium of any of aspects 16-17, wherein the instructions cause the at least one computer hardware processor to: after identifying the one or more network attack paths, generate a table storing information specifying the one or more network attack paths; and cause storage of the table in at least one datastore.

19. The at least one non-transitory computer readable storage medium of any of aspects 16-18 wherein the instructions cause the at least one computer hardware processor to: generate a risk score for each of the one or more network attack paths, the risk score representing a degree to which a network attack path may be used to exploit the one or more security vulnerabilities of the network resources in the set of network resources; cause storage of the risk score for each of the one or more network attack paths in at least one table; and output a ranking of the one or more network attack paths based on their respective risk scores.

20. The at least one non-transitory computer readable storage medium of any of aspects 16-19, wherein a first network path of the plurality of network paths comprises a first network resource in the set of network resources, the one or more security vulnerabilities comprise a first security vulnerability, the instructions to cause the at least one computer hardware processor to: determine that at least one portion of the relational representation corresponding to the first network resource conforms to a network attack path definition defining the first security vulnerability; and identify the first network resource to have the first security vulnerability based on the at least one portion of the relational representation conforming to the network attack path definition.

21. A method for visualizing exploitable security vulnerabilities in a computing environment, the computing environment comprising a plurality of network resources and network connections therebetween, the method comprising: using at least one computer hardware processor to perform: identifying one or more vulnerable network resources in the plurality of network resources, each of the one or more vulnerable network resources having at least one respective security vulnerability; accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources; identifying, using the at least one portion of the relational representation, one or more network attack paths between the one or more vulnerable network resources and network resources in the set of network resources; generating, using the at least one portion of the relational representation, a graph comprising nodes and edges, the nodes representing the one or more vulnerable network resources and network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources.

22. The method of aspect 21, further comprising: obtaining metadata indicating the set of network resources in the plurality of network resources and the network connections among the network resources in the set of network resources; and generating, using the metadata, the relational representation of the set of network resources.

23. The method of any of aspects 21-22, further comprising: generating, using the relational representation, a plurality of network paths between network resources in the set of network resources; and identifying, from among the plurality of network paths and using the relational representation and information indicating one or more of the plurality of network resources that have the at least one respective security vulnerability, at least the one or more network attack paths.

24. The method of any of aspects 21-23, wherein generating the GUI comprising the visualization comprises generating at least one GUI element containing content indicating an explanation for why the one or more network attack paths are identified as attack paths.

25. The method of any of aspects 21-24, wherein generating the GUI comprising the visualization comprises generating at least one GUI element containing content indicating one or more operations actionable by a user to at least one of mitigate or resolve the at least one respective security vulnerability of the one or more vulnerable network resources.

26. The method of any of aspects 21-25, wherein generating the at least one GUI element comprises identifying at least one of (i) an update to firmware or software of the one or more vulnerable network resources, (ii) one or more changes to security settings of the one or more vulnerable network resources, or (iii) a reconfiguration of at least one portion of the computing environment as the one or more operations.

27. The method of any of aspects 21-26, further comprising: receiving user input indicating a selection of a node in the plurality of nodes, the node displayed in the visualization, the selected node representing one of the one or more vulnerable network resources; and identifying one or more nodes in the plurality of nodes that have a respective network connection to the selected node, and wherein generating the GUI comprising the visualization comprises: displaying at least one GUI element containing content that indicates that the one or more nodes in the plurality of nodes are exploitable based on the one or more nodes having a respective network connection to a node representing a vulnerable network resource.

28. A network attack path visualization system comprising: at least one non-transitory computer readable storage medium storing instructions; and at least one computer hardware processor to execute the instructions to perform a method for visualizing exploitable security vulnerabilities in a computing environment, the computing environment comprising a plurality of network resources and network connections therebetween, the method comprising: identifying one or more vulnerable network resources in the plurality of network resources, each of the one or more vulnerable network resources having at least one respective security vulnerability; accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources; identifying, using the at least one portion of the relational representation, one or more network attack paths between the one or more vulnerable network resources and network resources in the set of network resources; generating, using the at least one portion of the relational representation, a graph comprising nodes and edges, the nodes representing the one or more vulnerable network resources and network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources.

29. The network attack path visualization system of aspect 28, wherein the at least one computer hardware processor is to: obtain metadata indicating the set of network resources in the plurality of network resources and the network connections among the network resources in the set of network resources; and generate, using the metadata, the relational representation of the set of network resources.

30. The network attack path visualization system of any of aspects 28-29, wherein the at least one computer hardware processor is to: generate, using the relational representation, a plurality of network paths between network resources in the set of network resources; and identify, from among the plurality of network paths and using the relational representation and information indicating one or more of the plurality of network resources that have the at least one respective security vulnerability, at least the one or more network attack paths.

31. The network attack path visualization system of any of aspects 28-30, wherein the at least one computer hardware processor is to generate the GUI comprising the visualization by generating at least one GUI element containing content indicating an explanation for why the one or more network attack paths are identified as attack paths.

32. The network attack path visualization system of any of aspects 28-31, wherein the at least one computer hardware processor is to generate the GUI comprising the visualization by generating at least one GUI element containing content indicating one or more operations actionable by a user to at least one of mitigate or resolve the at least one respective security vulnerability of the one or more vulnerable network resources.

33. The network attack path visualization system of any of aspects 28-32, wherein the at least one computer hardware processor is to generate the at least one GUI element by identifying at least one of (i) an update to firmware or software of the one or more vulnerable network resources, (ii) one or more changes to security settings of the one or more vulnerable network resources, or (iii) a reconfiguration of at least one portion of the computing environment as the one or more operations.

34. The network attack path visualization system of any of aspects 28-33, wherein the at least one computer hardware processor is to: receive user input indicating a selection of a node in the plurality of nodes, the node displayed in the visualization, the selected node representing one of the one or more vulnerable network resources; and identify one or more nodes in the plurality of nodes that have a respective network connection to the selected node, and wherein the at least one computer hardware processor is to generate the GUI comprising the visualization by displaying at least one GUI element containing content that indicates that the one or more nodes in the plurality of nodes are exploitable based on the one or more nodes having a respective network connection to a node representing a vulnerable network resource.

35. At least one non-transitory computer readable storage medium comprising instructions that, when executed by at least one computer hardware processor, causes the at least one computer hardware processor to perform a method for visualizing exploitable security vulnerabilities in a computing environment, the computing environment comprising a plurality of network resources and network connections therebetween, the method comprising: identifying one or more vulnerable network resources in the plurality of network resources, each of the one or more vulnerable network resources having at least one respective security vulnerability; accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources; identifying, using the at least one portion of the relational representation, one or more network attack paths between the one or more vulnerable network resources and network resources in the set of network resources; generating, using the at least one portion of the relational representation, a graph comprising nodes and edges, the nodes representing the one or more vulnerable network resources and network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources.

36. The at least one non-transitory computer readable storage medium of aspect 35, wherein the instructions cause the at least one computer hardware processor to: obtain metadata indicating the set of network resources in the plurality of network resources and the network connections among the network resources in the set of network resources; and generate, using the metadata, the relational representation of the set of network resources.

37. The at least one non-transitory computer readable storage medium of any of aspects 35-36, wherein the instructions cause the at least one computer hardware processor to: generate, using the relational representation, a plurality of network paths between network resources in the set of network resources; and identify, from among the plurality of network paths and using the relational representation and information indicating one or more of the plurality of network resources that have the at least one respective security vulnerability, at least the one or more network attack paths.

38. The at least one non-transitory computer readable storage medium of any of aspects 35-37, wherein the instructions cause the at least one computer hardware processor to generate the GUI comprising the visualization by generating at least one GUI element containing content indicating an explanation for why the one or more network attack paths are identified as attack paths.

39. The at least one non-transitory computer readable storage medium of any of aspects 35-38, wherein the instructions cause the at least one computer hardware processor to generate the GUI comprising the visualization by generating at least one GUI element containing content indicating one or more operations actionable by a user to at least one of mitigate or resolve the at least one respective security vulnerability of the one or more vulnerable network resources.

40. The at least one non-transitory computer readable storage medium of any of aspects 35-39, wherein the instructions cause the at least one computer hardware processor to: receive user input indicating a selection of a node in the plurality of nodes, the node displayed in the visualization, the selected node representing one of the one or more vulnerable network resources; and identify one or more nodes in the plurality of nodes that have a respective network connection to the selected node, and wherein the instructions cause the at least one computer hardware processor to generate the GUI comprising the visualization by displaying at least one GUI element containing content that indicates that the one or more nodes in the plurality of nodes are exploitable based on the one or more nodes having a respective network connection to a node representing a vulnerable network resource.

What is claimed is:

1. A method for visualizing exploitable security vulnerabilities in a computing environment, the computing environment comprising a plurality of network resources and network connections therebetween, the method comprising:
using at least one computer hardware processor to perform:
identifying one or more vulnerable network resources in the plurality of network resources, each of the one or more vulnerable network resources having at least one respective security vulnerability;
accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources;
identifying, using the at least one portion of the relational representation, one or more network attack paths between the one or more vulnerable network resources and at least some network resources in the set of network resources;
generating, using the at least one portion of the relational representation, a graph comprising nodes and edges, the nodes representing the one or more vulnerable network resources and the at least some network resources in the set of network resources along the one or more network attack paths, the edges representing the one or more network attack paths; and
generating a graphical user interface (GUI) comprising a visualization of the graph and information indicating that the one or more attack paths may be used to exploit one or more security vulnerabilities of network resources in the set of network resources,
wherein the method further comprises:
receiving user input indicating a selection of a node in the plurality of nodes, the node displayed in the visualization, the selected node representing one of the one or more vulnerable network resources; and
identifying one or more nodes in the plurality of nodes that have a respective network connection to the selected node, and wherein
generating the GUI comprising the visualization comprises:
displaying at least one GUI element containing content that indicates that the one or more nodes in the plurality of nodes are exploitable based on the one or more nodes having a respective network connection to a node representing a vulnerable network resource.

2. The method of claim 1, further comprising:
obtaining metadata indicating the set of network resources in the plurality of network resources and the network connections among the network resources in the set of network resources; and
generating, using the metadata, the relational representation of the set of network resources.

3. The method of claim 2, further comprising:
generating, using the relational representation, a plurality of network paths between the network resources in the set of network resources; and
identifying, from among the plurality of network paths and using the relational representation and information indicating one or more of the plurality of network resources that have the at least one respective security vulnerability, at least the one or more network attack paths.

4. The method of claim 1, wherein generating the GUI comprising the visualization comprises generating at least one GUI element containing content indicating an explanation for why the one or more network attack paths are identified as the one more network attack paths.

5. The method of claim 1, wherein generating the GUI comprising the visualization comprises generating at least one GUI element containing content indicating one or more operations actionable by a user to at least one of mitigate or resolve the at least one respective security vulnerability of the one or more vulnerable network resources.

6. The method of claim 5, wherein generating the at least one GUI element comprises identifying at least one of (i) an update to firmware or software of the one or more vulnerable network resources, (ii) one or more changes to security settings of the one or more vulnerable network resources, or (iii) a reconfiguration of at least one portion of the computing environment as the one or more operations.

7. A network attack path visualization system comprising:
at least one non-transitory computer readable storage medium storing instructions; and
at least one computer hardware processor to execute the instructions to perform a method for visualizing exploitable security vulnerabilities in a computing environment, the computing environment comprising a plurality of network resources and network connections therebetween, the method comprising:
identifying one or more vulnerable network resources in the plurality of network resources, each of the one or more vulnerable network resources having at least one respective security vulnerability;

accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources;

identifying, using the at least one portion of the relational representation, one or more network attack paths between the one or more vulnerable network resources and at least some network resources in the set of network resources;

generating, using the at least one portion of the relational representation, a graph comprising nodes and edges, the nodes representing the one or more vulnerable network resources and the at least some network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources, wherein the method further comprises:

receiving user input indicating a selection of a node in the plurality of nodes, the node displayed in the visualization, the selected node representing one of the one or more vulnerable network resources; and identifying one or more nodes in the plurality of nodes that have a respective network connection to the selected node, and wherein generating the GUI comprising the visualization comprises:

displaying at least one GUI element containing content that indicates that the one or more nodes in the plurality of nodes are exploitable based on the one or more nodes having a respective network connection to a node representing a vulnerable network resource.

8. The network attack path visualization system of claim 7, wherein the at least one computer hardware processor is to:

obtain metadata indicating the set of network resources in the plurality of network resources and the network connections among the network resources in the set of network resources; and generate, using the metadata, the relational representation of the set of network resources.

9. The network attack path visualization system of claim 8, wherein the at least one computer hardware processor is to:

generate, using the relational representation, a plurality of network paths between the network resources in the set of network resources; and identify, from among the plurality of network paths and using the relational representation and information indicating one or more of the plurality of network resources that have the at least one respective security vulnerability, at least the one or more network attack paths.

10. The network attack path visualization system of claim 7, wherein the at least one computer hardware processor is to generate the GUI comprising the visualization by generating at least one GUI element containing content indicating an explanation for why the one or more network attack paths are identified as the one more network attack paths.

11. The network attack path visualization system of claim 7, wherein the at least one computer hardware processor is to generate the GUI comprising the visualization by generating at least one GUI element containing content indicating one or more operations actionable by a user to at least one of mitigate or resolve the at least one respective security vulnerability of the one or more vulnerable network resources.

12. The network attack path visualization system of claim 11, wherein the at least one computer hardware processor is to generate the at least one GUI element by identifying at least one of (i) an update to firmware or software of the one or more vulnerable network resources, (ii) one or more changes to security settings of the one or more vulnerable network resources, or (iii) a reconfiguration of at least one portion of the computing environment as the one or more operations.

13. At least one non-transitory computer readable storage medium comprising instructions that, when executed by at least one computer hardware processor, causes the at least one computer hardware processor to perform a method for visualizing exploitable security vulnerabilities in a computing environment, the computing environment comprising a plurality of network resources and network connections therebetween, the method comprising:

identifying one or more vulnerable network resources in the plurality of network resources, each of the one or more vulnerable network resources having at least one respective security vulnerability;

accessing at least one portion of a relational representation of a set of network resources in the plurality of network resources, the relational representation indicating network resources in the set of network resources and network connections among the network resources in the set of network resources, the at least one portion of the relational representation corresponding to the one or more vulnerable network resources;

identifying, using the at least one portion of the relational representation, one or more network attack paths between the one or more vulnerable network resources and at least some network resources in the set of network resources;

generating, using the at least one portion of the relational representation, a graph comprising nodes and edges, the nodes representing the one or more vulnerable network resources and the at least some network resources in the set of network resources along the one or more network attack paths, the edges representing the one or more network attack paths; and generating a graphical user interface (GUI) comprising a visualization of the graph and information indicating that the one or more attack paths may be used to exploit one or more security vulnerabilities of network resources in the set of network resources, wherein the method further comprises:

receiving user input indicating a selection of a node in the plurality of nodes, the node displayed in the visualization, the selected node representing one of the one or more vulnerable network resources; and identifying one or more nodes in the plurality of nodes that have a respective network connection to the selected node, and wherein generating the GUI comprising the visualization comprises:

displaying at least one GUI element containing content that indicates that the one or more nodes in the plurality of nodes are exploitable based on the one or more nodes having a respective network connection to a node representing a vulnerable network resource.

14. The least one non-transitory computer readable storage medium of claim 13, wherein the instructions cause the at least one computer hardware processor to:

obtain metadata indicating the set of network resources in the plurality of network resources and the network connections among the network resources in the set of network resources; and generate, using the metadata, the relational representation of the set of network resources.

15. The least one non-transitory computer readable storage medium of claim 14, wherein the instructions cause the at least one computer hardware processor to:

generate, using the relational representation, a plurality of network paths between the network resources in the set of network resources; and identify, from among the plurality of network paths and using the relational representation and information indicating one or more of the plurality of network resources that have the at least one respective security vulnerability, at least the one or more network attack paths.

16. The least one non-transitory computer readable storage medium of claim 13, wherein the instructions cause the at least one computer hardware processor to generate the GUI comprising the visualization by generating at least one GUI element containing content indicating an explanation for why the one or more network attack paths are identified as the one more network attack paths.

17. The least one non-transitory computer readable storage medium of claim 13, wherein the instructions cause the at least one computer hardware processor to generate the GUI comprising the visualization by generating at least one GUI element containing content indicating one or more operations actionable by a user to at least one of mitigate or resolve the at least one respective security vulnerability of the one or more vulnerable network resources.

* * * * *